US 10,614,296 B2

United States Patent
Chetlur et al.

(10) Patent No.: US 10,614,296 B2
(45) Date of Patent: *Apr. 7, 2020

(54) GENERATING AUXILIARY INFORMATION FOR A MEDIA PRESENTATION

(71) Applicant: International Business Machines Corporation, Armonk, NY (US)

(72) Inventors: Malolan Chetlur, Bangalore (IN); Vijay Ekambaram, Chennai (IN); Vikas V. Joshi, Bangalore (IN); Ashok Pon Kumar Sree Prakash, Bangalore (IN); Sharad Sundararajan, Weehawken, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,116

(22) Filed: Apr. 30, 2018

(65) Prior Publication Data

US 2018/0247114 A1    Aug. 30, 2018

Related U.S. Application Data

(63) Continuation of application No. 15/208,776, filed on Jul. 13, 2016, now Pat. No. 10,043,062.

(51) Int. Cl.
    *G06F 3/00*    (2006.01)
    *G06F 13/00*  (2006.01)
    (Continued)

(52) U.S. Cl.
    CPC ..... *G06K 9/00315* (2013.01); *G06K 9/00302* (2013.01); *G06K 9/628* (2013.01);
    (Continued)

(58) Field of Classification Search
    CPC ....... H04N 21/44222; H04N 21/42201; H04N 21/4532
    See application file for complete search history.

(56) References Cited

U.S. PATENT DOCUMENTS

| | | | |
|---|---|---|---|
| 6,973,428 B2 | 12/2005 | Boguraev et al. | |
| 8,639,072 B2 | 1/2014 | Popovich et al. | |

(Continued)

FOREIGN PATENT DOCUMENTS

| | | |
|---|---|---|
| CN | 201499247 U | 6/2010 |
| CN | 201523392 U | 7/2010 |

(Continued)

OTHER PUBLICATIONS

Office Action for U.S. Appl. No. 15/208,690 dated Apr. 4, 2017, 21 pages.

(Continued)

*Primary Examiner* — Jason P Salce

(74) *Attorney, Agent, or Firm* — Amin, Turocy & Watson, LLP

(57) ABSTRACT

Techniques for generating auxiliary information for a media presentation are provided. In one example, a computer-implemented method comprises receiving, by a device operatively coupled to a processor, first feedback information for a group of users regarding mental states of the users during a media presentation. The computer-implemented method can further comprise determining, by the device, first parts of the media presentation considered confusing to at least some of the users and second parts of the media presentation considered interesting to at least some of the users based on the first feedback information, and generating, by the device, an index data structure comprising first information identifying the first parts and classifying the first (Continued)

parts as confusing and second information identifying the second parts and classifying the second parts as interesting.

20 Claims, 10 Drawing Sheets

(51) Int. Cl.
| | |
|---|---|
| H04N 5/445 | (2011.01) |
| G06K 9/00 | (2006.01) |
| G06K 9/62 | (2006.01) |
| H04N 21/442 | (2011.01) |
| H04N 21/44 | (2011.01) |
| H04N 21/81 | (2011.01) |
| G09B 5/12 | (2006.01) |
| H04N 21/4722 | (2011.01) |
| G09B 7/02 | (2006.01) |
| H04N 21/422 | (2011.01) |
| H04N 21/4223 | (2011.01) |

(52) U.S. Cl.
CPC ............... *G09B 5/12* (2013.01); *G09B 7/02* (2013.01); *H04N 21/44008* (2013.01); *H04N 21/44218* (2013.01); *H04N 21/4722* (2013.01); *H04N 21/8133* (2013.01); *H04N 21/4223* (2013.01); *H04N 21/42203* (2013.01)

(56) References Cited

U.S. PATENT DOCUMENTS

| | | | |
|---|---|---|---|
| 8,666,961 | B1 | 3/2014 | Qureshi et al. |
| 9,642,536 | B2 | 5/2017 | Kashef et al. |
| 9,741,258 | B1 | 8/2017 | Chetlur et al. |
| 10,089,896 | B2 | 10/2018 | Chetlur et al. |
| 2005/0055710 | A1* | 3/2005 | Aoki .................. H04N 5/44513 725/32 |
| 2005/0078968 | A1 | 4/2005 | Ohta |
| 2007/0271518 | A1* | 11/2007 | Tischer .................. H04H 60/31 715/744 |
| 2007/0288971 | A1 | 12/2007 | Cragun et al. |
| 2008/0019665 | A1* | 1/2008 | Huang ............... G11B 27/3027 386/278 |
| 2009/0143695 | A1 | 6/2009 | Mullen et al. |
| 2009/0213572 | A1 | 8/2009 | Benson et al. |
| 2010/0281497 | A1 | 11/2010 | Miyazaki |
| 2011/0301433 | A1 | 12/2011 | Sadowsky et al. |
| 2012/0072939 | A1 | 3/2012 | Crenshaw |
| 2012/0166952 | A1 | 6/2012 | Alexandrov et al. |
| 2013/0246049 | A1 | 9/2013 | Mirhaji |
| 2013/0246447 | A1 | 9/2013 | Wickramasuriya et al. |
| 2013/0293577 | A1 | 11/2013 | Perez et al. |
| 2014/0130076 | A1 | 5/2014 | Moore et al. |
| 2014/0237495 | A1 | 8/2014 | Jang et al. |
| 2015/0141865 | A1 | 5/2015 | Nakajima et al. |
| 2015/0163558 | A1 | 6/2015 | Wheatley |
| 2015/0279426 | A1 | 10/2015 | Maurer et al. |
| 2016/0042226 | A1 | 2/2016 | Cunico et al. |
| 2016/0191995 | A1 | 6/2016 | el Kaliouby et al. |
| 2016/0217321 | A1 | 7/2016 | Gottlieb |

FOREIGN PATENT DOCUMENTS

| | | |
|---|---|---|
| CN | 203084971 U | 7/2013 |
| EP | 1538535 A3 | 6/2005 |
| WO | 2009101954 A1 | 8/2009 |

OTHER PUBLICATIONS

Office Action for U.S. Appl. No. 15/208,776 dated Aug. 15, 2017, 25 pages.
Office Action for U.S. Appl. No. 15/208,776 dated Jan. 19, 2018, 22 pages.
Office Action for U.S. Appl. No. 15/645,593 dated Nov. 3, 2017, 19 pages.
Non-Final Office Action received for U.S. Appl. No. 15/910,762 dated Jul. 31, 2019, 22 pages.
Final Office Action received for U.S. Appl. No. 15/910,771 dated Aug. 8, 2019, 18 pages.
Non-Final Office Action received for U.S. Appl. No. 15/966,132 dated Jul. 11, 2019, 35 pages.
Non-Final Office Action received for U.S. Appl. No. 15/886,050 dated Apr. 3, 2019, 36 pages.
Non-Final Office Action received for U.S. Appl. No. 15/910,736 dated Apr. 4, 2019, 37 pages.
Non-Final Office Action received for U.S. Appl. No. 15/910,762 dated Apr. 4, 2019, 31 pages.
Non-Final Office Action received for U.S. Appl. No. 15/910,771 dated Apr. 3, 2019, 36 pages.
Non-Final Office Action received for U.S. Appl. No. 15/966,125 dated Jun. 28, 2019, 30 pages.
Notice of Allowance for U.S. Appl. No. 15/886,050 dated Oct. 28, 2019, 33 pages.
List of IBM Patents or Applications Treated as Related.

* cited by examiner

Content Classification Index — "Ionic Bonding"

| Topic | Slide | Keywords | Confusing | Interesting |
|---|---|---|---|---|
| Topic 1 | 1 | Ionic bonds, metal, nonmetal | n/a | n/a |
| Topic 2 | 1 | formation, neutral atoms | 7 | n/a |
| Topic 3 | 2 | ion, number, electrons | 2 | 6 |
| Topic 4 | 2 | lose, positve, cations | 4 | 6 |
| Topic 5 | 3 | negative, anions | n/a | 3 |
| Topic 6 | 3 | sodium, magnesium | n/a | n/a |
| Topic 7 | 4 | polyatomic ions | n/a | 9 |
| Topic 8 | 5 | properties, crystalline, rigid | 9 | n/a |
| Topic 9 | 6 | conducting, electricity | n/a | 8 |
| Topic 10 | 7 | solids, brittle, repulsion | 5 | 5 |

FIG. 2

Auxiliary Information Index — "Ionic Bonding"

| Topic | Slide | Keywords | Clarifying | | Supplementary | |
|---|---|---|---|---|---|---|
| | | | Version 1 | Version 2 | Version 1 | Version 2 |
| Topic 1 | 1 | Ionic bonds, metal, nonmetal | | | | |
| Topic 2 | 1 | formation, neutral atoms | C-103 | C-104 | | |
| Topic 3 | 2 | ion, number, electrons | C-105 | C-106 | S-105 | S-106 |
| Topic 4 | 2 | lose, positve, cations | C-107 | C-108 | S-107 | S-108 |
| Topic 5 | 3 | negative, anions | | | S-109 | S-110 |
| Topic 6 | 3 | sodium, magnesium | | | | |
| Topic 7 | 4 | polyatomic ions | C-116 | C-117 | S-114 | S-115 |
| Topic 8 | 5 | properties, crystalline, rigid | | | | |
| Topic 9 | 6 | conducting, electricity | C-120 | | S-118 | S-119 |
| Topic 10 | 7 | solids, brittle, repulsion | C-120 | C-121 | S-120 | S-121 |

FIG. 5

GENERATING AUXILIARY INFORMATION FOR A MEDIA PRESENTATION

BACKGROUND

The subject disclosure relates to generating auxiliary information for a media presentation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments, systems, computer-implemented methods, apparatus and/or computer program products that facilitate generating auxiliary information for a media presentation are described.

According to an embodiment, a system is provided that can comprise a memory that stores computer-executable components and a processor that executes computer-executable components stored in the memory. In one or more implementations, the computer-executable components can comprise a feedback component that receives first feedback information for a group of users regarding mental states of the users during a media presentation. The computer-executable components can further comprise an analysis component that determines first parts of the media presentation considered confusing to at least some of the users and second parts of the media presentation considered interesting to at least some of the users based on the first feedback information. The computer-executable components can further comprise an index component that generates an index data structure comprising: first information identifying the first parts and classifying the first parts as confusing; and second information identifying the second parts and classifying the second parts as interesting.

According to another embodiment, a computer-implemented method is provided. In one example, the computer-implemented method comprises receiving, by a device operatively coupled to a processor, first feedback information for a group of users regarding mental states of the users during a media presentation. The computer-implemented method can further comprise determining, by the device, levels of confusion associated with respective parts of the presentation and levels of interest associated with the respective parts of the presentation based on the first feedback information. The computer-implemented method can further comprise classifying, by the device, first parts of the respective parts of the presentation as confusing based on the levels of confusion associated with the first parts being above a threshold level of confusion. The computer-implemented method can further comprise classifying, by the device, second parts of the respective parts of the presentation as interesting based on the levels of interest associated with the second parts being above a threshold level of interest.

In yet another embodiment, a computer program for identifying respective parts of a media presentation considered confusing or interesting is described. The computer program product comprises a computer readable storage medium having program instructions embodied therewith, and the program instructions are executable by a processing component to cause the processing component to identify, based on feedback information regarding facial expressions of users during a first presentation of the media presentation to the users, first parts of the media presentation considered confusing to at least some of the users and second parts of the media presentation considered interesting to at least some of the users. The program instructions can further cause the processing component to generate an index data structure comprising first information identifying the first parts and including respective clarifying information for the first parts, and second information identifying the second parts and including respective supplementary information for the second parts.

DESCRIPTION OF THE DRAWINGS

FIG. 2 presents a table of an example, non-limiting content classification index for a media presentation in accordance with one or more embodiments described herein.

FIG. 5 presents a table of an example, non-limiting auxiliary information index for a media presentation in accordance with one or more embodiments described herein.

DETAILED DESCRIPTION

Figure 1:
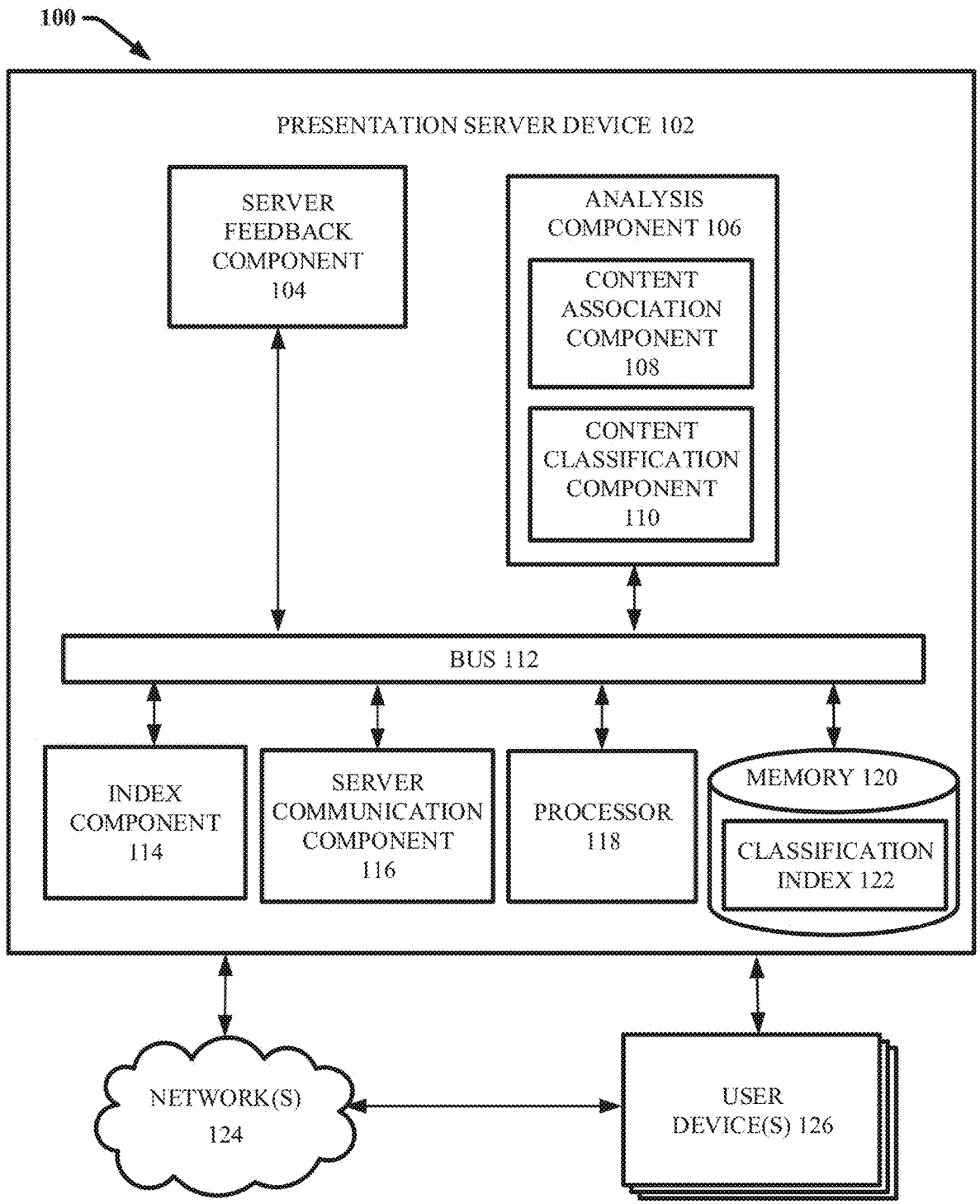
FIG. 1 illustrates a block diagram of an example, non-limiting system that facilitates classifying content of a media presentation in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure is directed to computer processing systems, computer-implemented methods, apparatus and/or computer program products that facilitate generating auxiliary information for a presentation based on user feedback received during presentation to a group of users. The user feedback can be associated with users' reactions to respective parts of the presentation. One or more aspects of the auxiliary information that is generated can later be provided to one or more new users when one or more new users subsequently experience the presentation. The presentation can include, for example, a live or recorded educational, informative, or instructional presentation in which one or more presenters speak about a particular subject and/or provide a visual demonstration related to the subject. For example, a presentation can include a live or recorded lecture presented by a professor to a group of students about atomic bonding while presenting and discussing a previously prepared slideshow on atomic bonding. In another example, a presentation can include a live or recorded audible description of different art included in a museum in association with a walking tour through the museum.

In particular, as a user is viewing, listening to or otherwise receiving a presentation via a user device, the user may be interested or intrigued by certain parts of the presentation, confused by certain parts of the presentation, bored with certain parts of the presentation, etc. When the presentation is experienced in a live environment, especially in a group setting, the user may be unable or too shy to ask the presenter questions associated with parts of the presentation the user finds interesting or confusing. Similarly, the user may be unable or too shy to inform the presenter that the user considers certain subject matter boring, not useful or otherwise not engaging in contexts in which the user or the presenter could elect to change the content or a part of the content of the presentation to different content the user would likely find more interesting, useful or engaging. Likewise, when experiencing a presentation in a non-live context, such as watching a video of a presentation, listening to an audio recording of a presentation, or clicking through a slideshow, the user may come across content the user finds interesting, confusing, boring, etc. However, the user may not be inclined or able to stop the presentation and lookup additional information (e.g., via searching sources on the Internet) or change the presentation (e.g., stop the presentation entirely, skip over some content etc.).

In accordance with one or more embodiments, the subject computer processing systems, computer-implemented methods, apparatus and/or computer program products facilitate classifying respective parts of a presentation based on user feedback generated during presentation of the presentation to a group of users regarding their impressions of different parts of the presentation. For example, the feedback can indicate whether one or more of the users find a part of the presentation confusing, interesting, boring, exciting, amusing, etc. In one or more implementations, the feedback can include information regarding respective mental states of one or more of the users during the presentation. In particular, techniques are provided for automatically detecting a mental state of a user during a presentation and correlating the mental state with a particular part of the presentation. In some implementations, the mental state of a user can be detected based on facial expressions exhibited by the user during the presentation. The facial expressions can indicate the user is confused, interested, bored, excited, amused, etc.

In one embodiment, the facial expressions are captured and/or detected via a heads-up display (HUD) device worn by the user or another device associated with the user. In some embodiments, a user can also provide explicit feedback regarding the user's impression of a particular part of a presentation. For example, the user can provide explicit input that states the user is confused, interested, bored etc. via the user device in association with presentation of a particular part of a presentation. In various additional embodiments, dialogue performed between the presenter and one or more of the users in the group during the presentation can be used to identify parts of the presentation the user considered confusing, interesting, boring, exciting, amusing, etc.

Based on user feedback received for a presentation regarding various users' aggregate impressions of respective parts of the presentation, the respective parts of the presentation can be classified as confusing, interesting, boring, exciting, amusing, etc. Based on the classifications associated with the respective parts of the presentation, auxiliary information can be generated and associated with the respective parts of the presentation. The type of auxiliary information that is associated with a part of the presentation can vary based on the classification associated therewith. For example, auxiliary information for a first part of a presentation classified as confusing can include clarifying information intended to clarify the confusion associated with the first part of the presentation. In another example, a second part of the presentation classified as interesting can be associated with supplementary auxiliary information that provides supplementary detailed examples and/or applications associated with the second part of the presentation.

In some implementations, different versions of the auxiliary information can be tailored to different user traits or preferences, such as different learning styles, educational levels, intellectual levels or abilities, reading levels, etc. The different versions can vary in the type of content of the auxiliary information, which can include, but is not limited to, text, images, video, audio and hyperlinks. The different versions can also vary with respect to an amount of content, a degree of complexity of the content, an intellectual level associated with the content, and the like. According to these embodiments, in addition to generating auxiliary information for a part of a presentation related to a mental state associated with the part, a particular version of the auxiliary information can be generated based on a trait or preference of the user that exhibited the mental state and/or based on a trait or preference of another user to whom the auxiliary information may later be provided.

In various embodiments, information classifying respective parts of the presentation as confusing, interesting, boring, exciting, amusing, etc., can be stored in an index data structure and associated with the presentation. The index data structure can also include information identifying auxiliary information entries that have been generated and provided for the respective parts of the presentation. When the presentation is subsequently presented to a new user, new feedback information can be received from the new users regarding the new user's individual impression to respective parts of the presentation, and the index data structure can be employed to automatically identify, retrieve and provide auxiliary information to the new user (e.g., at a user device of the new user) based on the new user's individual impressions of the respective parts of the presentation. For example, based on a determination that the new user is confused about topic 2 of a presentation, a determination can be made as to whether clarifying auxiliary information has been obtained at the index data structure for topic 2 of the presentation. In response to a determination that clarifying information has been obtained (and stored) for topic 2, the clarifying information can be retrieved and provided to the new user.

The various features and functionalities of the disclosed computer processing systems, computer-implemented methods, apparatus and/or computer program products facilitate automatically providing auxiliary information to user devices while a user is viewing, listening to, or otherwise experiencing a presentation. The auxiliary information can be provided when desired or needed as determined based on implicit (e.g., a determined mental state) or explicit (e.g., a direct request for the auxiliary information) feedback detected at the user device during the presentation. Accordingly, a plurality of users can view or experience the same presentation in a live or non-live setting and receive different auxiliary information at different times during the presentation based on their individual responses to different parts of the presentation and/or based on their individual traits and preferences. Therefore a same presentation can be tailored to the needs and preferences of different users (in some embodiments, in real-time or substantially real-time) as the respective users experience the presentation, thus enabling various users to experience the presentation in a more fulfilling and enjoyable manner.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates a block diagram of an example, non-limiting system 100 that facilitates classifying content of a presentation in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

One or more implementations of the system 100 and/or the components of the system 100 can provide substantial improvements to live and Internet based learning systems by generating an auxiliary information index that includes information identifying respective parts of a presentation considered confusing and interesting to users and associating defined auxiliary information with the respective parts. As a result, the subject systems can automatically provide users with auxiliary information related to a presentation in real-time or substantially real-time based on the users' mental and emotional states and preferences. Accordingly, a plurality of users can view or experience the same presentation in a live or non-live setting and receive different auxiliary information at different times during the presentation based on their individual responses to different parts of the presentation and/or their individual traits and preferences. Therefore, the same presentation can be dynamically and automatically tailored to the needs and preferences of different users in real-time as the respective users experience the presentation, thus enabling each user to experience the presentation in a more fulfilling and enjoyable manner.

The system 100 and/or the components of the system 100 can be employed to use hardware and/or software to solve problems that are highly technical in nature, that are not abstract and that cannot be performed as a set of mental acts by a human. For example, system 100 and/or the components of the system 100 can be employed to use hardware and/or software to perform operations including affective computing related to automatically detecting and recognizing emotional information, correlating the emotional information with presentation content associated with causation of a specific mental state, and automatically selecting and providing auxiliary information for the presentation content. Further, some of the processes performed may be performed by specialized computers for carrying out defined tasks related to the performing affective computing to facilitate receiving and correlating emotional state information with respective parts of a presentation to automatically determine parts of a presentation that are considered confusing or interesting. System 100 and/or components of the system 100 can be employed to solve new problems that arise through advancements in technology, computer networks, the Internet and the like. System 100 can further provide technical improvements to live and Internet based learning systems by improving processing efficiency among processing components associated with selecting and providing auxiliary information associated with a presentation in real-time based a user's current mental state and preferences using an auxiliary information index.

As shown in FIG. 1, system 100 can include a presentation server device 102, one or more networks 124 and one or more user devices 126. The presentation server device 102 can include various computer-executable components, including, but not limited to, server feedback component 104, analysis component 106, index component 114 and server communication component 116. The presentation server device 102 can also include or otherwise be associated with at least one memory 120 that stores computer-executable components (e.g., the server feedback component 104, the analysis component 106, the index component 114, and the server communication component 116). The presentation server device 102 can also include or otherwise be associated with at least one processor 118 that executes the computer-executable components stored in the memory 120. The presentation server device 102 can further include a system bus 112 that can couple the various components including, but not limited to, the server feedback component 104, the analysis component 106, the index component 114, the server communication component 116, the memory 120 and/or the processor 118.

In various embodiments, the presentation server device 102 and the one or more user devices 126 can operate in a server/client relationship wherein auxiliary information associated with a presentation is provided by the presentation server device 102 to the one or more user devices 126 based on processing, by the presentation server device 102 and/or the one or more user devices 126, of feedback information regarding the need or desire for the auxiliary information by respective users associated with the one or more user devices 126. In some implementations, the presentation server device 102 and the one or more user devices 126 can be communicatively connected via one or more networks 124. Such networks 124 can include wired and wireless networks, including, but not limited to, a cellular network, a wide area network (WAN) e.g., the Internet) or a local area network (LAN). For example, the one or more user devices 126 can communicate with presentation server device 102 (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLU- ETOOTH®, Session Initiation Protocol (SIP), ZIGBEE®, RF4CE protocol, WirelessHART protocol, 6LoWPAN (IPv6 over Low power Wireless Area Networks), Z-Wave, and/or an ultra-wideband (UWB) standard protocol.

For example, in one embodiment, one or more user devices 126 can be respectively associated with students located in relatively close proximity to the presentation server device 102 (e.g., within the same physical classroom space). According to this embodiment, the one or more user devices 126 and the presentation server device 102 can be communicatively connected via an area network (e.g., LAN). In another embodiment, the one or more user devices 126 can be respectively associated with students located in disparate remote physical locations relative to the presentation server device 102. According to this embodiment, the one or more user devices 126 and the presentation server device 102 can be communicatively connected via a WAN (e.g., a cellular network, the Internet, etc.). In an aspect, one or more components of system 100 can interact via disparate networks.

The presentation server device 102 can include server communication component 116 to facilitate wireless communication between the presentation server device 102 and the one or more user devices 126, and/or between the presentation server device 102 and one or more other external devices (not shown). For example, the server communication component 116 can receive feedback information from one or more user devices 126 and/or one or more other devices (e.g., a remote camera, sensors worn by the user, etc.) and forward the feedback information to the server feedback component 104 for processing. The server communication component 116 can also send auxiliary information to the one or more user devices 126 for rendering at the respective user devices in association with viewing, listening to, or otherwise experiencing a presentation. In some embodiments, the server communication component 116 can also send presentation data to the one or more user devices. For example, the server communication component 116 can send slides included in a slideshow component of a presentation for rendering at the respective user devices. In another example in which the presentation includes a video, the server communication component 116 can send the video to the respective user devices. In yet another example in which the presentation includes an audio recording, the server communication component 116 can send the audio recording to the respective user devices.

In some embodiments, the server communication component 116 can stream a presentation to the one or more user devices 126. For an example, in an embodiment in which the presentation includes a live or recorded video and/or audio, the server communication component 116 can stream the live or recorded video and/or audio to the one or more user devices 126. The server communication component 116 can be or include hardware (e.g., a central processing unit (CPU), a transceiver, a decoder), software (e.g., a set of threads, a set of processes, software in execution) or a combination of hardware and software that facilitates communicating information between the presentation server device 102 and the one or more user devices 126. Although in system 100 various components (e.g., the server feedback component 104, the analysis component 106, the index component 114, and the server communication component 116) are provided on a server device (e.g., a presentation server device 102), in other embodiments, any number of different types of devices can be associated with or include the aforementioned components. All such embodiments are envisaged. Further, although in the embodiment shown the server feedback component 104, the analysis component 106, the index component 114, and the server communication component 116 are provided at the presentation server device 102, it should be appreciated that the architecture of system 100 is not so limited. For example, one or more of the components included at the presentation server device 102 can be located at another device, such as another server device, an intermediary device between the server device and the one or more user devices 126, or at the one or more user devices 126, etc.

The one or more user devices 126 can include any suitable computing device associated with a user and that can receive and render auxiliary information associated with a presentation provided by the presentation server device 102. In some implementations, the one or more user devices 126 can also facilitate capturing feedback information regarding the respective users' need or desire for the auxiliary information and providing the feedback information to the presentation server device 102 (e.g., as discussed infra with respect to FIG. 3). For example, the one or more user devices 126 can include a desktop computer, a laptop computer, a television, an Internet enabled television, a mobile phone, a smartphone, a tablet user computer (PC), a digital assistant (PDA), a HUD, a virtual reality (VR) headset, an augmented reality (AR) headset, or another type of wearable computing device. As used in this disclosure, the terms "user," "teacher," "student," "presenter," "presentee," and the like refer to a person, entity, system, or combination thereof that can employ system 100 (or additional systems described in this disclosure) using a user device of the one or more user devices 126 or the presentation server device 102.

In various embodiments, the presentation server device 102 facilitates classifying content of a media presentation based on user feedback. The term "media presentation" is used herein to describe a live or recorded (e.g., an audio recording, a video recording, or a video recording including audio) presentation that includes a visual component, an audio component, or both a visual and an audio component. In various implementations, the media presentation can be educational, informative or instructive in nature. For example, a media presentation can include a live or recorded lecture presented by a teacher to group of students. In some implementations, the live or recorded lecture can be presented in association with a slideshow having a sequence of slides, such as slideshow presentation created using POWERPOINT® or a similar software application. The information included in the respective slides can include text, charts, images, video, audio, hyperlinks, or the like. In another example, a media presentation can include a live or recorded demonstration performed by one or more people. For instance, a media presentation can include a live or recorded presentation of an experiment (e.g., a laboratory experiment), a procedure (e.g., a surgical procedure), or an activity (e.g., cooking, snowboarding). In another example, a media presentation can include a live or recorded presentation in which one or more presenters describe and/or demonstrate how to do an activity (e.g., a "how-to" video). In yet another example, a media presentation can include a live or recorded presentation in which a tour guide walks through a museum and provides informative information about different art pieces in the museum. Still in another example, a media presentation can include an audio recording of the tour through the museum. According to this example, the audio recording can be listened to by museum visitors using headphones associated via a wearable device as they walk through the museum and auxiliary information can be rendered via the wearable device based feedback received from the respective visitors in association with presentation of the audio recording.

In order to facilitate classifying content of a media presentation, the presentation server device 102 can include server feedback component 104 to receive feedback information for a group of users regarding their impressions of respective parts of the media presentation. In one or more embodiments, this feedback information can include information regarding mental states of users over the course of the presentation. For example, in association with viewing, listening to or otherwise experiencing a presentation, the server feedback component 104 can receive feedback information for a user that indicates the user is intrigued or particularly interested, confused, bored or unengaged, amused, excited, concerned or worried, offended, etc. The analysis component 106 can further correlate respective mental states of the users with respective parts of the presentation associated with causation of the respective mental states to classify the respective parts as confusing, interesting, exciting, boring, etc. In some implementations, feedback regarding a mental state of a user can be based on one or more facial expressions expressed by the user during the presentation. For example, system 100 can employ various existing emotion recognition technologies that can determine a user's mental or emotional state based on analysis of facial expressions and/or eye movement of the user captured in video or one or more images of the user. With facial emotion detection, algorithms can detect faces within a photo or video, and sense micro expressions by analyzing the relationship between points on the face, based on curated databases compiled in academic environments. According to these implementations, as a user is viewing, listening to, or otherwise experiencing a presentation via a user device, facials expressions and/or eye movements of the user can be captured and/or detected via one or more user facing cameras. For example, in some embodiments, the user can wear a HUD device including a user facing camera or image sensor that can capture facial expressions and/or eye movements of the user during a presentation. In another example, a user facing camera can be included on a device such as a tablet, smartphone, desktop or laptop computer employed by the user and capture facial expressions and/or eye movements of the user during a presentation. In another example, an external user facing camera can be included in a same room as the user or a group of users and capture facial expressions and/or eye movements of the respective users. In some embodiments, the user facing camera or cameras can be or be provided at the one or more user devices 126 associated with the respective users at which auxiliary information for the presentation is rendered.

In various embodiments, image data of a user face during a presentation can be captured and processed to determine a mental state of the user in real-time or substantially real-time. As used herein, the term "real-time" can mean processing and capturing to determine the mental state within a defined number of minutes or seconds (e.g., within 10 seconds, within 30 seconds, within 60 seconds, within 2 minutes) after the image data is generated. Accordingly, as the user is viewing, listening to, or otherwise experiencing a presentation, one or more mental states of the user over the course of the presentation can be determined in real-time or substantially real-time. In some embodiments, captured facial expressions and/or eye movements can be processed by the capture device (e.g., a user device of the one or more user devices 126 or another device) that captured the respective facial expressions and/or eye movements to determine a mental or emotional state of the user. The capture device can further send feedback information identifying the determined mental or emotional state of the user to the presentation server device 102 in real-time or substantially real-time. According to these embodiments, the server feedback component 104 can receive information that identifies respective mental states of the user over the course of a presentation in real-time or substantially real-time. For example, in one embodiment, a camera or image sensor can be included at a user device associated with a user (e.g., a user device of the one or more user devices 126). The user device can capture (e.g., via the camera or image sensor) and process facial expressions and/or eye movements of the user during the presentation to determine a mental state of the user (e.g., interested, confused, excited, bored, amused, offended, etc.). The user device can further provide information identifying the mental state of the user to the presentation server device 102 in real-time or substantially real-time (in response to capture and processing). In other embodiments, image data of a user face captured during a presentation (e.g., by a camera or image sensor at the user device or another device) can be sent to the presentation server device 102 by the capture device for processing by the server feedback component 104. For example, a user device (e.g., a HUD device, a tablet, a laptop computer, a desktop computer, etc.) associated with a user experiencing a presentation can capture image data of the user face during the presentation and send the image data (e.g., in real-time or substantially real-time) to the presentation server device 102 for processing by the server feedback component 104. According to these embodiments, the server feedback component 104 can receive image data (e.g., video or still images) captured of a user face during a presentation and process the image data to determine respective mental or emotional states of the user during the presentation in real-time or substantially real-time.

In various additional embodiments, feedback information regarding a mental or emotional state of a user during a presentation can be determined based on analysis of speech spoken by the user during the presentation. According to these embodiments, the user device employed by the user, the presentation server device 102, or another device within audible range of the user can include audio recording hardware and software to record and analyze speech spoken by the user during a presentation. For example, the speech can include a question raised by the user. In another example, the speech can include dialogue between the user and the presenter or between the user and another user. In some implementations, analysis of the speech can include analysis of tone and word content using one or more sonic algorithms to determine a mental or emotional state of the user during the presentation. Similar to the image data, the server feedback component 104 can receive processed speech data from the capture device associated with capture of the motion data (e.g., the user device of the one or more user devices 126, the presentation server device 102, or another device) identifying a mental or emotional state of the user based on the speech data, and/or receive raw speech data from the capture device for processing by the server feedback component 104 to determine the mental or emotional state associated with the speech data. In another embodiment, feedback information regarding a mental or emotional state of a user during a presentation can be determined based on analysis of body movement or gestures of the user during the presentation. For example, motion information regarding movement and motion of the user during a presentation can be captured and analyzed to identify gestures or body language indicative of different emotional states of the user during the presentation. According to this embodiment, in one aspect, one or more motion sensors can be worn by the user or be included in a device worn by the user (e.g., the user device of the one or more user devices 126 or another device) and capture motion data regarding motion or movement of the user during the presentation (e.g., gestures, fidgeting, remaining relatively still, changing a body position, blinking, foot tapping, etc.). In another expect, information regarding user motion during presentation can be discerned from image data (e.g., video) captured of the user during the presentation. The server feedback component 104 can further receive processed motion data from the capture device associated with capture of the motion data (e.g., a user device of the one or more user devices 126 or another device) identifying a mental or emotional state of the user based on the motion data, and/or receive raw motion data for processing by the server feedback component 104 to determine the mental or emotional state associated with the motion data.

In another embodiment, feedback information regarding a mental or emotional state of a user during a presentation can be determined based on analysis of biometric data captured from the user during the presentation. For example, the biometric information can include, but is not limited to, information regarding the user's heart rate, respiratory rate, muscle tension, and hormone levels (e.g., cortisol, oxytocin, acetylcholine, dopamine, serotonin, gaba, glutamine, endorphin, epinephrine, norepinephrine, and glutamate). According to this embodiment, one or more biometric sensors can be worn by the user (e.g., external to the body and/or internal to the body), and/or be included in a device worn by the user (e.g., a user device of the one or more user devices 126 or another device) and biometric data associated with the user during the presentation. The server feedback component 104 can further receive processed biometric data from the capture device associated with capture of the biometric data (e.g., the user device) identifying a mental or emotional state of the user based on the biometric data, and/or receive raw biometric data for processing by the server feedback component 104 to determine the mental or emotional state associated with the biometric data.

In addition to determining a user's mental state based on feedback information including one or more facial expressions of the user, speech of the user, motion of the user and/or biometric information of the user received in response to the presentation, the server feedback component 104 can also receive explicit user feedback regarding a user's impression of particular parts of a presentation. For example, as the user is viewing, listening to or otherwise experiencing a presentation, the user can provide the server feedback component 104 direct input (e.g., via the user's user device 126) identifying a mental reaction of the user to a particular part of a presentation (e.g., input identifying the user as being confused, interested, bored, excited, etc). For example, the user device (e.g., a user device of the one or more user devices 126 or another device) can include a suitable input mechanism (e.g., selection of a hard or soft button, a touch screen, a keypad, a keyboard, a mouse, voice input, gesture input, etc.) via which the user can provide direct input indicating a mental state of the user (e.g., input stating or meaning "I'm confused"). For example, the user can select a hard or soft button on the user device, provide verbal or textual input, perform a gesture or generate another defined signal that can be received by the server feedback component 104 and indicate the user is confused about a particular part of the presentation. Similarly, the user can select a different button on the user device, provide different verbal or textual input, perform a different gesture, or generate a different defined signal that can be received by the server feedback component 104 and indicate the user is interested in a particular part of the presentation and would like some clarifying information. In some embodiments in which the presentation is a live presentation, the server feedback component 104 can also receive feedback information regarding dialogue associated with the live presentation. For example, the dialogue can include dialogue between the presenter and one or more users experiencing the presentation, referred to herein as a "presentee." The dialogue can also include dialogue between two or more presentees. For instance, in a live presentation taking place in a classroom environment in which a teacher is presenting a lecture to a group of students, at various times throughout the class, dialogue can include question and answer sessions between students and the teacher as well as discussions between students. According to these embodiments, the presentation server device 102 can include suitable audio recording hardware and software to record audio during a presentation. In other embodiments, an audio recording of the presentation can be captured by a device external to the presentation server device 102 (e.g., a user device or another device) and provided to the server feedback component 104.

In one or more embodiments, the analysis component 106 can analyze received feedback associated with a presentation to identify and classify respective parts of the presentation associated with the feedback. In particular, the analysis component 106 can include content association component 108 to correlate feedback indicating a particular mental state of a user (e.g., interested, confused, bored, excited, amuse, not amused, etc.) with a specific part of the content included in the presentation that is or was being presented at the time the feedback is received or within a defined amount of time after the feedback is received. The content association component 108 can also correlate dialogue (e.g., student-teacher interaction) during the presentation with respective parts of the presentation (e.g., respective topics, sub-topics, elements, slides, etc.). For instance, in one or more embodiments, the presentation server device 102 can have access to information identifying content included in a prior showing of the presentation (e.g., in memory 120 or at another device). For example, in embodiments in which the presentation is a live presentation, the presentation server device 102 can have access to information (e.g., an outline) that identifies different topics and sub-topics to be discussed in the presentation and content respectively associated with the different topics and sub-topics. In another example in which the presentation includes a live or recorded presentation that includes a slideshow, the presentation server device 102 can have access to information identifying content included in respective slides of the slideshow and/or content associated with different parts or elements of a single slide.

In some embodiments, the content association component 108 can determine a part of the content included in a presentation that is associated with reception of user feedback based on timing of reception of the feedback and a current time point or time frame associated with the presentation. For example, the presentation can include a live or recorded presentation associated with a known duration wherein particular parts or content included in the presentation are associated with known time points or time frames over the duration of the presentation. For example, with respect to a presentation including a plurality of known topics identified as topic 1, topic, 2, topic 3, etc., each (or, in some embodiments, one or more) of the different topics can be associated with known time points or time frames throughout the presentation. Information regarding content respectively associated with different time points or time frames of the presentation can be stored in memory 120 or otherwise accessible to the content association component 108. Accordingly, the content association component 108 can determine a time point or time frame of the presentation associated with reception of particular feedback (e.g., a user mental state and/or dialogue). For example, in some implementations, the presentation server device 102 can receive information identifying the start time of the presentation and track the presentation time following the start of the presentation to determine a time in the presentation when the feedback is or was received. In some embodiments, in which the presentation includes a video, the presentation server device 102 can play the video or stream the video to the user devices 126 of the users and thus easily correlate received feedback from the user with a current time point or time frame of the video. The content association component 108 can further identify the particular content of the presentation (e.g., topic 1, topic, 2, topic, 3, etc.) associated with that time point or time frame.

In another embodiment in which the presentation includes a slideshow, the content association component 108 can have access to information (e.g., stored in memory 120 or at another device) identifying content of the presentation respectively associated with each slide (or, in some embodiments, with one or more slides). The content association component 108 can further determine or receive information identifying a current slide that is or was being presented during a presentation at a time when the feedback is or was received (e.g., including mental state feedback and dialogue feedback). For example, in some embodiments, the presentation server device 102 can provide or render the respective slides and thus have direct knowledge about what slide is or was being presented when particular feedback is or was received. In some implementations, the content association component 108 can further have access to information identifying sub-topics or elements in a same slide and determine the particular sub-topic or element of a same slide that is being presented at the time feedback is received. For example, the slides can include interactive slides in which different elements or parts of a single slide can be activated or highlighted. According to this implementation, the content association component 108 can determine the particular sub-topic or element being presented at the time feedback is or was received based on information indicating a particular part or element of the slide is being pointed to, highlighted, selected or otherwise activated.

Still in other embodiments, the presentation server device 102 can include or have access to information associating known keywords in a presentation with specific parts of the content of the presentation. According to these embodiments, the server feedback component 104 can receive or determine information identifying a known keyword or keywords that are spoken during the presentation at a time associated with reception of feedback (e.g., including user mental state feedback and dialogue feedback). For example, in embodiments in which the presentation server device 102 is located within audible range of the presenter, the presentation server device 102 can include or employ speech recognition hardware and software to capture speech spoken by the presenter and identify keywords spoken throughout the presentation. The content association component 108 can further determine a keyword or keywords spoken at a particular time or within a defined amount of time after reception of the feedback and further correlate the feedback with the known part of the content associated with the keyword or keywords. In other embodiments, the user device associated with the user (e.g., a user device of the one or more user devices 126 or another device) can include the speech recognition hardware and/or software and determine the keyword or keywords being presented at a time when the user generates or provides the feedback regarding the user's mental state or explicit need or desire for auxiliary information. According to these embodiments, the user device can include information identifying the keyword or keywords in association with providing the feedback information to the server feedback component 104.

Still in other embodiments, the content association component 108 can analyze recorded audio of a presentation to identify and characterize different parts of a presentation and to associate user feedback with the different parts. For example, in embodiments in which the presentation server device 102 has limited or no knowledge regarding the content of a presentation before the presentation is initially presented, the content association component 108 can employ suitable speech analysis hardware and software provided at the presentation server device 102 to identify keywords associated with respective parts of the presentation for which feedback is received (e.g., including feedback regarding mental states of users and/or dialogue associated with the presentation). The content association component 108 can then generate information identifying the keys words and associating the keywords with received feedback. For example, in some implementations, the presenter can state a title of a particular topic of a presentation and the content association component 108 can identify feedback that is or was received shortly after announcing of the topic title and generate information associating that feedback with the topic title. In another example, the content association component 108 can identify clusters of related words associated with specific feedback indicating a plurality of users are confused, interested, excited, bored, etc. The related words can be grouped and considered a particular topic or part of the presentation. The content association component 108 can further generate information associating the cluster of related words with the specific user feedback. The content association component 108 can also identify pauses or breaks in the presentation recording and employ these pauses or breaks to identify different parts or topics of the presentation. For example, the content association component 108 can determine subject matter discussed after a pause or break to be a new topic or sub-topic. Thus in essence, the content association component 108 can determine what the presenter was talking about when presentees provided feedback indicating they were confused, interested, bored, excited, etc. and/or when dialogue ensued, and generate information identifying what the presenter was talking about with the feedback.

The content classification component 110 can analyze information developed by the content association component 108 associating received feedback with different parts of a presentation to classify the different parts of the presentation. In one or more embodiments, the different parts of the presentation can be classified to reflect the collective (or, in various embodiments, average or majority) sentiment of the group of users as reflected in their feedback. For example, the content classification component 110 can classify a part of a presentation as confusing, interesting, boring, exciting, amusing, etc. For example, in one or more implementations, for a defined part of the presentation, the content classification component 110 can determine a collective (or, in various embodiments, an average or majority) user impression of the part of the presentation based on the most prominent mental state associated with the part of the presentation. According to this example, classification of the part of the presentation will reflect the mental state of the majority of users in the group. For example, in a classroom setting including 10 students, if 6 of the students expressed confusion for a part of the presentation, 2 of the students expressed interest, and 2 of the students expressed interest, the content classification component 110 can classify the part of the presentation as confusing.

In some implementations, the content classification component 110 can further determine a degree to which respective users considered a part of a presentation confusing, interesting, boring, exciting, amusing, etc., based on the distribution of mental states associated with the par of the presentation. The content classification component 110 can determine and associate a score (e.g., with respect to an arbitrary scale) with the part of the presentation indicating the degree. For example, the content classification component 110 can score a part of a presentation classified as confusing, interesting, boring, amusing, etc., based on a percentage of the mental states indicating confusion, interest, boredom, amusement, etc. According to this example, the greater the percentage, the higher the score. For instance, in furtherance to the example, above, the part of the presentation considered confusing can be associated with a score of 6, 6/10 or 60%.

In various embodiments, rather than classifying a part of a presentation with a single classification, the content classification component 110 can associate information with respective parts of the presentation that indicates a degree to which some of the users found it confusing, interesting, boring, exciting, amusing, etc. For example, user feedback associated with a part of a presentation can indicate that some users found the part of the presentation confusing while other users found it interesting. Thus according to some embodiments, the content classification component 110 can associate two or more classifications with a part of a presentation regarding two or more mental states associated with the part of the presentation wherein each classification is associated with a score indicating the percentage of users that had the respective mental states in association with the part of the presentation. In some embodiments, the content classification component 110 can have access to information identifying character traits and/or preferences associated with respective presentees from which feedback is received. For example, the respective presentees can be associated with user profiles including whether the user prefers visual auxiliary information or textual auxiliary information. In another example, the profile information can indicate whether the user prefers complex auxiliary information, simple auxiliary information, short auxiliary information, long auxiliary information, etc. With regards to educational presentations, the user profile information can include, but is not limited to, information regarding a user's intellectual level or capability (e.g., intelligence quotient (IQ)), grades, learning type (e.g., visual, mathematical, kinesthetic, auditory, etc.), reading level or speed of the user, degree of background knowledge in the presentation subject matter, multitasking ability, and the like. According to these embodiments, in addition to classifying a part of a presentation with information indicating a mental state associated with the presentation and/or a level or degree of user that exhibited the mental state, the content classification component 110 can further determine one or more traits or preferences of the users that exhibited that mental state. For example, the content classification component 110 can associate information with a part of a presentation indicating 60% of the users found it confusing and a majority of these users are visual learners. In another example, the content classification component 110 can associate information with a part of a presentation indicating users having an intellectual level above a threshold level (e.g., an IQ above 100) found this part of the presentation very interesting.

In one or more embodiments, the content classification component 110 can further employ information regarding dialogue associated with respective parts of a presentation to further facilitate classifying the respective parts of the presentation. For example, the content classification component 110 can determine that mental state feedback shows many students are confused about a particular part of a presentation and this is corroborated by the fact that dialogue was initiated by one or more users for or during the part of the presentation. According to these embodiments, the content classification component 110 can classify a part of a presentation as highly consuming, highly interesting, highly exciting, etc., based on association of dialogue with the part, the duration of the dialogue, and/or an amount of questions associated with the dialogue. The content classification component 110 can further analyze feedback regarding mental states of presentees associated with the part of the presentation corresponding to the dialogue to determine a particular mental state associated with the part of the presentation.

According to these embodiments, parts of the presentation associated with dialogue can be considered either more interesting and/or more confusing than other parts of the presentation for which dialogue was not initiated. For example, dialogue between a presentee and a presenter during a live presentation generally can be initiated by a question or remark made by the presentee or the presenter. Generally, when a presentee poses a question to the presenter, the presentee may be either confused about the subject matter being presented and/or desirous of clarification or interested in the subject matter being presented and desirous of additional information. Accordingly, parts of a presentation that are associated with dialogue between the presentee and the presenter that begin with a question being raised by a presentee can be distinguished as interesting or confusing. Similarly, when a presenter poses a question for answering by a presentee, information can be gleaned from the answers provided by the presentee as to whether the presentee understands the subject matter in question. In some implementations, the content classification component 110 can further determine parts of the presentation that are associated with a greater amount or duration of dialogue than other parts of the presentation. For example, parts of a presentation that spur a greater amount or duration of discussion can generally be considered more important, confusing, interesting, etc., than other parts of the presentation associated with dialogue of a lesser amount or of a shorter duration. Accordingly, the content classification component 110 can classify parts of a presentation associated with relatively high amounts or long duration of dialogue as being particularly confusing, interesting or important. In another implementation, the content classification component 110 can further identify a number of questions respectively associated with different parts of a presentation. For example, parts of a presentation associated with a greater amount of questions relative to other parts of the presentation can generally be considered more confusing or interesting. Accordingly, the content classification component 110 can classify parts of a presentation associated with relatively high amounts of questions as being particularly confusing, interesting or important. Thus content classification component 110 can further correlate mental states of presentees with respective parts of the presentation associated with dialogue, relatively long durations of dialogue, and/or relatively high amounts of questions, to further determine a degree to which the presentees considered the respective parts confusing, interesting, boring, exciting, amusing, etc.

Using the information determined by the analysis component 106, the index component 114 can generate an index for the presentation that identifies respective parts of the presentation and the classifications associated with the parts of the presentation. In various embodiments, this index is referred to herein as a classification index. For example, the classification index 122 can include, but is not limited to: information identifying respective parts of a presentation, one or more keywords associated with the respective parts, one or more slides associated with the respective parts (e.g., when the presentation includes a slideshow), a particular aspect or elements of a single slide associated with the respective parts, one or more classifications of the respective parts, values or scores associated with the classifications, and/or one or more user traits or preferences associated with the respective classifications. In various implementations, the classification index 122 can be stored in memory 120 and employed by the presentation server device 102 to facilitate associating auxiliary information with the respective parts of the presentation and later providing the auxiliary information to new users when the presentation is later presented to the new users (and those new users need or desire auxiliary information).

FIG. 2 presents a table of an example, non-limiting content classification index 200 for a media presentation in accordance with one or more embodiments described herein. Repetitive description of like embodiments employed in respective embodiments is omitted for sake of brevity. The classification index 200 was generated by index component 114. The classification index 200 can be provided for a presentation titled "Ionic Bonding" and can include content classification information for respective parts of the presentation generated based on feedback received in association with presentation of the presentation to a group of users. For example, in one implementation, the presentation was prepared by a teacher and presented to a group of students in a live setting. The presentation includes 10 defined topics associated with 7 prepared slides. The classification index 200 includes information identifying various topics and the respective slides with which the topics are associated.

The classification index 200 can also include keywords associated with the topics. In some implementations, the keywords were detected via analysis of speech spoken during the presentation (e.g., by the presenter) using voice recognition hardware and software (e.g., provided at the user device or the presentation server device 102) to facilitate identifying the current topic being presented. The classification index 200 further includes classification categories "confusing" and "interesting." Each topic can be associated with either a score or value indicating a degree to which the topic was considered confusing or interesting or the value "n/a" indicating that little or no users considered the topic confusing or interesting. For example, as shown in classification index 200, little or no users considered topic 1 confusing or interesting.

In an aspect, the index component 114 can employ a threshold requirement to determine whether to associate a value of "n/a" with a topic classification. For example, the index component 114 can associate "n/a" with a topic when less than N users found the topic confusing or interesting. Also, in the embodiment shown, some of the topics were considered confusing to some users yet interesting to others while other topics were classified as either confusing or interesting, but not both. In one implementation, the number value associated with a topic classification can reflect the number of users that considered the topic confusing or interesting, respectively.

Figure 3:
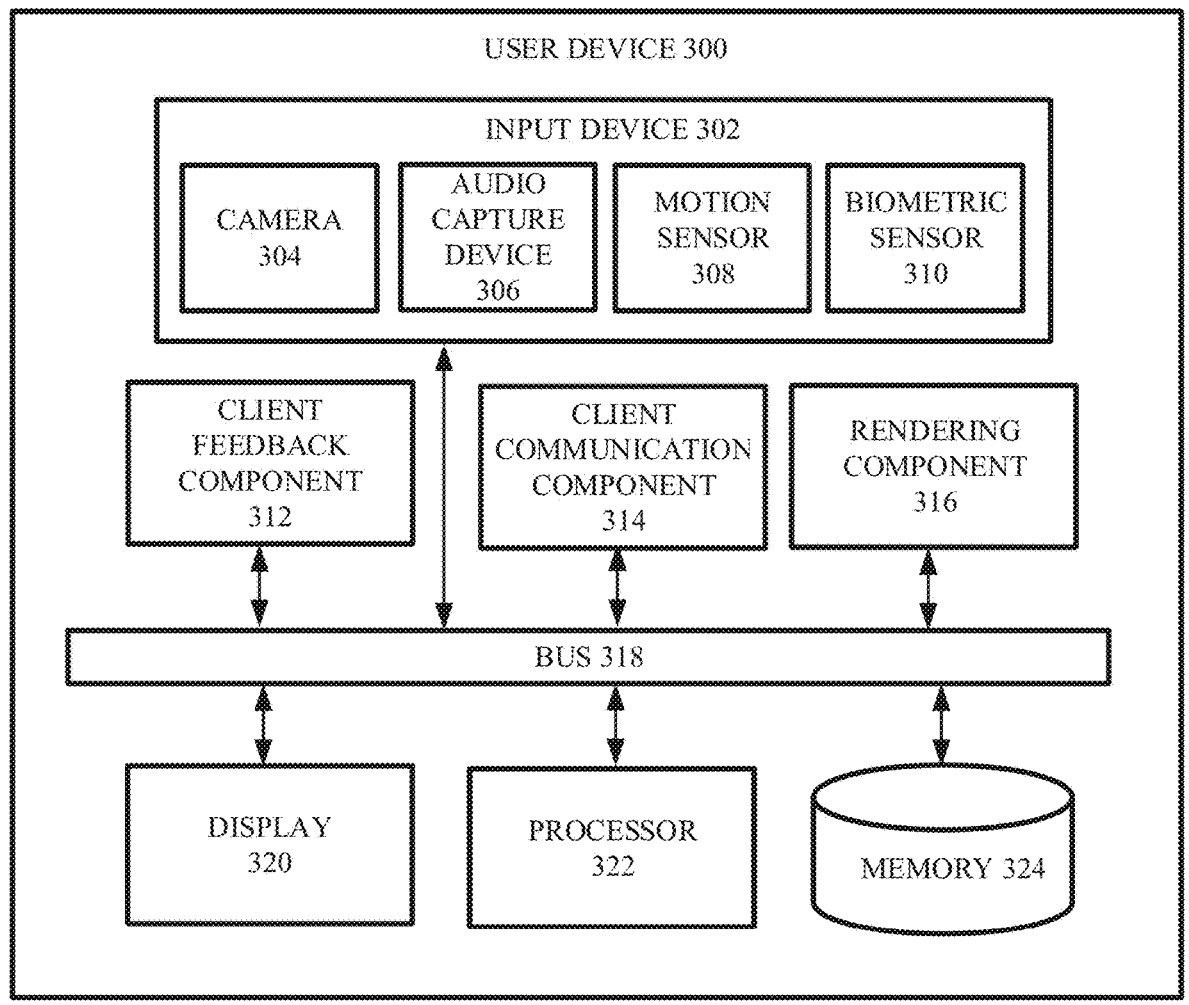
FIG. 3 illustrates a block diagram of an example, non-limiting user device that facilitates classifying content of a media presentation and generating auxiliary information for the content in accordance with one or more embodiments described herein.

FIG. 3 illustrates a block diagram of an example, non-limiting user device 300 that facilitates classifying content of a media presentation and generating auxiliary information for the content in accordance with one or more embodiments described herein. In various embodiments, user device 300 can be or include a user device of the one or more user devices 126 presented in system 100. Repetitive description of like embodiments employed in respective embodiments is omitted for sake of brevity.

User device 300 can include an input device 302, client feedback component 312, client communication component 314, rendering component 316 and a display 320. The user device 300 can also include or otherwise be associated with at least one memory 324 that stores computer-executable components (e.g., the client feedback component 312, the client communication component 314, and the rendering component 316). The user device 300 can also include or otherwise be associated with at least one processor 322 that executes the computer-executable components stored in the memory 120. The user device 300 can further include a device bus 318 that can couple the various components including, but not limited to, the input device 302, the client feedback component 312, the client communication component 314, the display 320, the memory 324 and/or processor 322. In one or more embodiments, the client feedback component 312 can receive and/or process user feedback information regarding an interest or desire for auxiliary content associated with a presentation. For example, the client feedback component 312 can receive feedback information regarding a mental state of a user associated with user device 300 during a presentation. In some implementations, such user feedback can be captured by the user device 300 via an input device 302 provided at the user device. For example, the input device 302 can include, but is not limited to, a camera 304, an audio capture device 306, one or more motion sensors 308 and/or one or more biometric sensors 310. In one implementation, the camera 304 can be a user facing camera that captures imagery (e.g., video and/or still images) of the user's face during a presentation. In some embodiments, the camera 304 can also capture video and/or images of the user that can be processed to detect and identify motion of the user (e.g., blinking of eyes, nodding of head, etc.). The audio capture device 306 can include a microphone or another type of audio capture device that can receive and record audio during a presentation, such as speech spoken by the user associated with user device 300, speech of a presenter of the presentation, dialogue between the user and the presenter, and/or dialogue between the user and another user. In some implementations, the audio capture device 306 can further process captured audio to convert detected speech to text. The one or more motion sensors 308 can include, for example, an accelerometer and/or a gyroscope that can detect motion of the user device 300 when worn, held or otherwise operated by the user. The one or more biometric sensors 310 can include biometric sensors that detect biometric information for the user during a presentation, including, but not limited to, heart rate, respiratory rate, and hormone levels of the user. In some implementations, one or more of the motion sensors 308 and/or the biometric sensors 310 can be external to the user device 300 (e.g., worn by the user, implanted within the user, etc.) and communicatively coupled to the user device 300.

In some embodiments, feedback information captured via the input device 302 can be received and processed by the client feedback component 312 to determine a mental state of the user based on the feedback. For example, the client feedback component 312 can determine a mental state of the user based on analysis of one or more facial expressions included in imaged data captured via the camera, based on analysis of tone of voice and words spoken in speech of the user captured via audio capture device 306, based on analysis of motion data regarding body language of the user captured via the one or more motion sensors 308, and/or based on analysis of biometric data for the user captured via the one or more biometric sensors 310. According to these embodiments, the client communication component 314 can send (e.g., in real-time or substantially real-time) the processed feedback data identifying a mental state of the user to the presentation server device 102 to facilitate receiving auxiliary information from the presentation server device 102. In other embodiments, the client communication component 314 can send (e.g., in some embodiments, in real-time or substantially real-time) the presentation server device 102 raw feedback information captured via the input device 302 for processing by the server feedback component 104. The client communication component 314 can include same or similar features and functionalities as server communication component 116. For example, in one or more embodiments, the client communication component 314 can include hardware and/or software that facilitate wired or wireless communication between the user device 300 and the presentation server device 102, and between the user device 300 and one or more other external devices (not shown).

In some embodiments, the client feedback component 312 can also receive explicit input (e.g., via the input device 302) indicating a mental state of the user and/or a desire for a type of auxiliary information associated with a presentation. For example, using an input mechanism provided by the input device 302, the user can generate a defined signal that indicates the user is confused, interested, bored, etc. at any given time during a presentation. Similarly, the user can provide input that includes an explicit request for a type of auxiliary information (e.g., "please provide me with clarifying information on this topic"). It should be appreciated that the input mechanism can vary. For example, the user can provide speech input, motion gesture input (e.g., blinking of eye, nodding of head, tapping of foot, raising of hand, etc.), as well as input via a hard or soft button, a keypad, a touch screen, a mouse, etc. The client feedback component 312 can also receive such explicit input and the client communication component 314 can provide this explicit input to the presentation server device 102.

Figure 4:
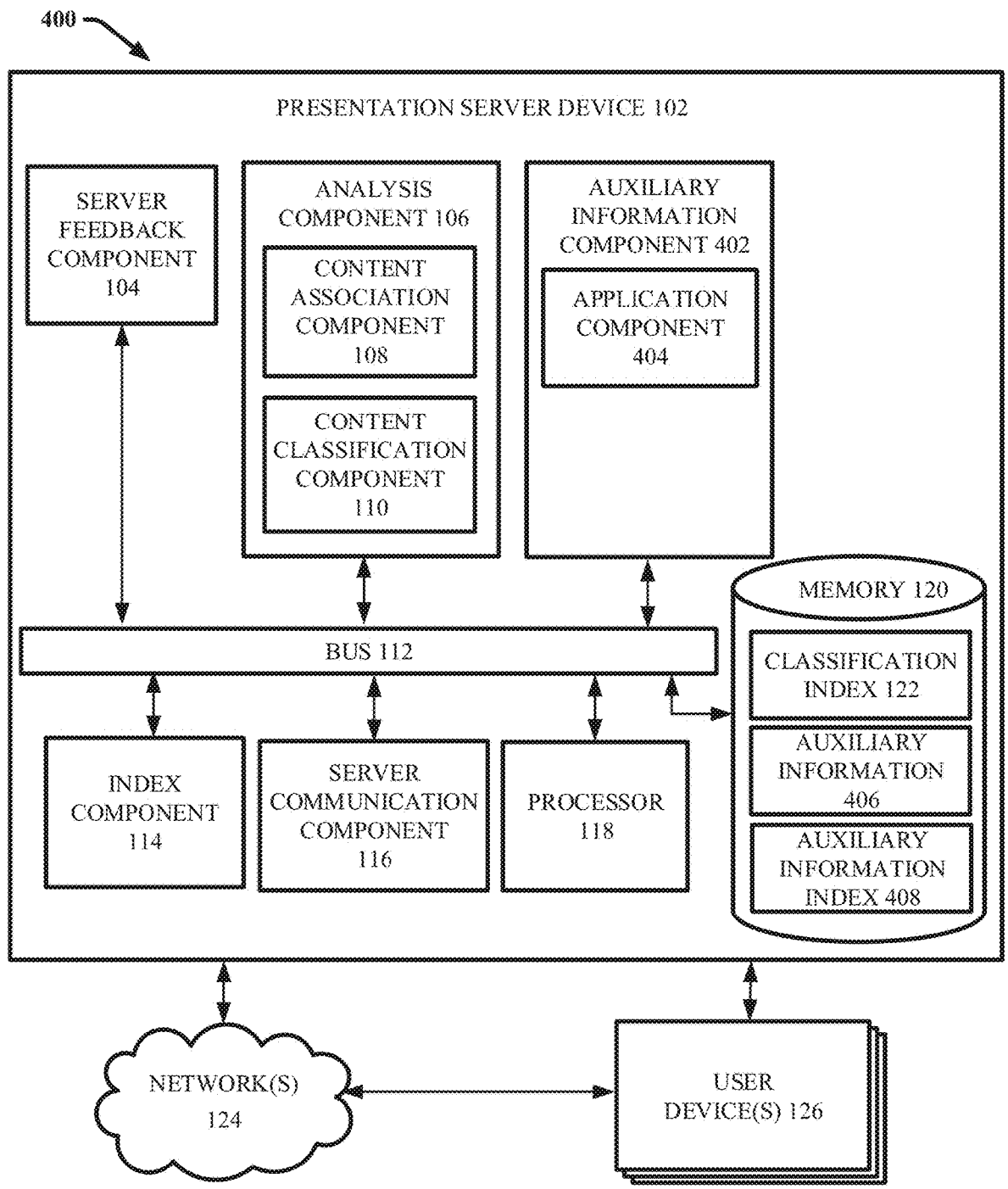
FIG. 4 illustrates a block diagram of an example, non-limiting system that facilitates classifying content of a media presentation and generating auxiliary information for the content in accordance with one or more embodiments described herein.

FIG. 4 illustrates a block diagram of an example, non-limiting system 400 that facilitates classifying content of a media presentation and generating auxiliary information for the content in accordance with one or more embodiments described herein. System 400 includes same or similar features as system 100 with the addition of auxiliary information component 402, application component 404 and auxiliary information database 406. Repetitive description of like elements employed in respective embodiment is omitted for sake of brevity. After the index component 114 generates a classification index for a presentation, in various embodiments, the auxiliary information component 402 can facilitate generating and associating auxiliary information with respective parts of a presentation based on the information included in the classification index. For example, as discussed above, the classification index 122 associated with a presentation can include, but is not limited to: information identifying respective parts of a presentation, one or more keywords associated with the respective parts, one or more slides associated with the respective parts (e.g., when the presentation includes a slideshow), a particular aspect or elements of a single slide associated with the respective parts, one or more classifications of the respective parts, values or scores associated with the classifications, and/or one or more user traits or preferences associated with the respective classifications.

In various embodiments, the application component 404 can receive auxiliary information for a part of a presentation and associate the auxiliary information with the part of the presentation that it was provided for. The auxiliary information can include, but is not limited to, text, images, charts, audio, video, and/or hyperlinks that associated with and related to a particular part of a presentation. The term auxiliary information "data entry" is used herein to refer to the auxiliary information that is associated with a defined part of a presentation and in some implementations, a defined type and/or version of auxiliary information. In one or more embodiments, various types of auxiliary information can be associated with defined mental states. For example, in some implementations, auxiliary information intended to facilitate helping a user better understand a part of the presentation about which the user is confused can be referred to herein as "clarifying" auxiliary information. In another example, auxiliary information intended to provide a user more detailed information or examples about a part of the presentation a user is particularly interested in or intrigued by is referred to herein as "supplementary" auxiliary information. In another example, auxiliary information intended to get a user's attention, (e.g., when the user provides feedback indicating the user is bored or uninterested), is referred to herein as "attention" auxiliary information. It should be appreciated that the above described auxiliary information types are merely exemplary and other types of auxiliary information related to different mental states, purposes, and/or content types are also envisioned.

In addition to having different types of auxiliary information for different mental states, different auxiliary information can also be associated with different user profiles associated with defined user traits and preferences. For example, with regards to educational presentations, user profile information can include, but is not limited to, information regarding a user's intellectual level or capability, grades, learning type (e.g., visual, mathematical, kinesthetic, auditory, etc.), reading level or speed of the user, degree of background knowledge in the presentation subject matter, multitasking ability, and the like. Thus in various embodiments, in addition to having different types of auxiliary information for different mental states, different versions of auxiliary information of a same type (e.g., clarifying, supplementary, attention, etc.) can be provided for a same part of content included in a presentation, wherein the different versions are associated with defined user traits and/or preferences. The different versions for example can include different types of content (e.g., text, vs. images or video), different amounts of content, different degrees of content complexity, and the like. For example, a first version of clarifying auxiliary information regarding how two molecules bind can include a visual animation including threedimensional models of the two molecules demonstrating how they bind, and second version of clarifying auxiliary information regarding how the two molecules bind can include chemical formulas of the two molecules when separated and when combined. According to this example, the first version of the clarifying information can be provided for a visual learner with a basic chemical background while the second version can be provided for mathematical learner with a more complex chemical background. In another example, a first version of supplementary auxiliary content that is intended for presentation to a slow reader can include less textual information relative to a second version of the supplementary auxiliary content that is intended for presentation to a fast reader.

In some embodiments, the application component 404 can receive the auxiliary information from the presenter of the presentation or anther suitable entity responsible for providing auxiliary information for the presentation. For example, in various implementations, the application component 404 can facilitate entry of auxiliary information via an interactive presentation application provided by the presentation server device 102 that facilitates generating presentations (e.g., slideshows, outlines, etc.), reviewing feedback received for a presentation, reviewing a classification index generated for a presentation, generating and applying auxiliary information to a presentation, refining auxiliary information applied to the presentation or the like. For example, the interactive presentation application can be provided via a website platform accessible via one or more networks 124, deployed as a dedicated application on a device accessible to the presenter (e.g., the presenter's laptop computer, work desktop computer, etc.), deployed as a thin client application on the device accessible to the presenter, deployed as a thick client application on the device accessible to the presenter, and the like.

In one or more embodiments, the presentation server device 102 can provide the presenter (or another suitable entity responsible for providing auxiliary content for the presentation) with the classification index generated for a presentation or the information included in the classification index (e.g., via the server communication component 116, via the interactive presentation application, etc.). Using the interactive presentation application or another suitable data entry mechanism, the presenter of the presentation (or another suitable entity responsible for providing auxiliary content for the presentation) can review and evaluate the classification information and decide for which parts of the presentation to provide auxiliary information, a type of auxiliary information to provide and/or a version of auxiliary information to provide. For example, the presenter can receive and review the information in the classification index and learn information regarding what parts of the presentation users found confusing, interesting, boring, exciting, amusing, etc. and a degree to which the users found the part of the presentation confusing, interesting, boring, exciting, amusing, etc. The presenter can then choose to provide an appropriate type of auxiliary information for the respective parts of the presentation. For example, the presenter can select a part of the presentation to associate with auxiliary information and generate an auxiliary information data entry for the part including text, images, audio, video, hyperlinks, etc. The application component 404 can further store the auxiliary information data entry in an auxiliary information database 406 and associate the auxiliary information data entry with the selected part of the presentation. In some implementations, the presenter can also employ classification information indicating user profile characteristics associated with a classification to tailor the auxiliary information to the profile type. For example, based on classification information indicating many visual learners in the class were confused about topic 2 of the presentation, the presenter can generate clarifying information that includes pictorial examples that help to explain topic 2.

In the embodiments described above, the application component 404 can provide a presenter with the classification index information generated for a presentation and can allow the presenter to manually evaluate the classification information to decide whether to provide auxiliary information for a part of the content, a type of the auxiliary information and/or a version of the auxiliary information. In another embodiment, the application component 404 can analyze the classification information to automatically output information identifying parts of the presentation for which to provide auxiliary information, a type of the auxiliary information and/or a version of the auxiliary information. According to this embodiment, the application component 404 can employ defined threshold requirements regarding a degree to which a part of the presentation was considered confusing, interesting, boring, exciting, amusing, etc., to identify one or more parts of the presentation for association with auxiliary information. For example, the application component 404 can identify one or more parts of a presentation associated with a classification score of X or above and recommend these one or more parts for association with auxiliary information. The content classification component 110 can further output information identifying these one or more parts of the presentation, a type auxiliary information to provide for one or more parts as determined by the application component 404 based on the classification associated with the one or more parts (e.g., clarifying, supplementary, etc.) and/or a version of the auxiliary information to provide for the one or more parts as determined by the application component 404. The application component 404 can make such determinations based on user traits and preferences associated with the classification of the parts (e.g., short, long, simple, complex, image based, math based, etc) in some embodiments. According to this embodiment, the presenter can spend less time manually reviewing the classification information and generate auxiliary information for only the most relevant parts of the presentation.

After auxiliary information entries are received for respective parts of a presentation and stored in the auxiliary information database 406, the index component 114 can further generate an auxiliary information index 408 that includes information identifying, the presentation and the defined parts (e.g., topics, sub-topics, elements, etc.) of the presentation. The auxiliary information index 408 can further include information identifying auxiliary information entries (e.g., included in auxiliary information database 406) respectively associated with one or more parts of the presentation, a type of the auxiliary information, a version of the auxiliary information, and/or a user profile trait or preference associated with the auxiliary information. In some embodiments in which the presentation includes slides, the auxiliary information index 408 can include information identifying respective slides associated with each part of the presentation. Similarly, in some embodiments in which the presentation includes a video, the auxiliary information index can include information identifying time points or time frames of the video associated with one or more parts of the presentation. In other embodiments in which the presentation includes speech, the auxiliary information index can include keywords respectively associated with different parts of the presentation. The auxiliary information index 408 can be stored in memory 120 or otherwise be made accessible to the presentation server device 102.

FIG. 5 presents a table of an example, non-limiting auxiliary information index 500 for a media presentation in accordance with one or more embodiments described herein. The auxiliary information index 500 is provided for a presentation titled "Ionic Bonding" including 10 defined topics respectively associated with 7 prepared slides. In one or more embodiments, the auxiliary information index 500 was generated by the index component 114 based in part on the classification index 200 generated for the presentation and auxiliary information received for the presentation. For example, in the embodiment shown, the topics identified in classification index 200 having the value "n/a" associated with the confusing classification and/or the interesting classification do not include auxiliary information entries for the corresponding categories, clarifying and supplementary, respectively. Repetitive description of like elements employed in respective embodiments is omitted for sake of brevity.

The auxiliary information index 500 can include information one or more topics and the respective slides associated with one or more topics. The auxiliary information index 500 further includes keywords associated with one or more topics. In addition, the auxiliary information index 500 includes information identifying auxiliary information respectively associated with one or more topics. In the embodiment shown, the auxiliary information can include two types of auxiliary information, clarifying auxiliary information and supplementary auxiliary information. Further each type of auxiliary information can have entries for a first version and a second version of the respective types of auxiliary information. For example, the first versions of the clarifying and supplementary auxiliary information can be intended for provision to students that are visual learners and the second versions of the clarifying and supplementary auxiliary information can be intended for provision to students that are mathematical learners. Each auxiliary information entry is associated with a unique identifier (e.g., C-103, C-104, S-105, S-106). These identifiers can facilitate identifying and retrieving the corresponding auxiliary information in the auxiliary information database 406 for providing to a new user based on new feedback received from the new user during presentation of the ionic bonding presentation to the new user (as described infra with reference to FIG. 6). For example, in response to a determination that Donna, a visual learner student, is confused in association with presentation of topic 8, the auxiliary information component 402 can retrieve the auxiliary information associated with identifier C-116 and provide this auxiliary information to Donna. Likewise, in response to a determination that Erin, a mathematical learner student, is particularly interested in topic 5, the auxiliary information component 402 can retrieve the auxiliary information associated with identifier S-110 and provide this auxiliary information to Erin.

Figure 6:
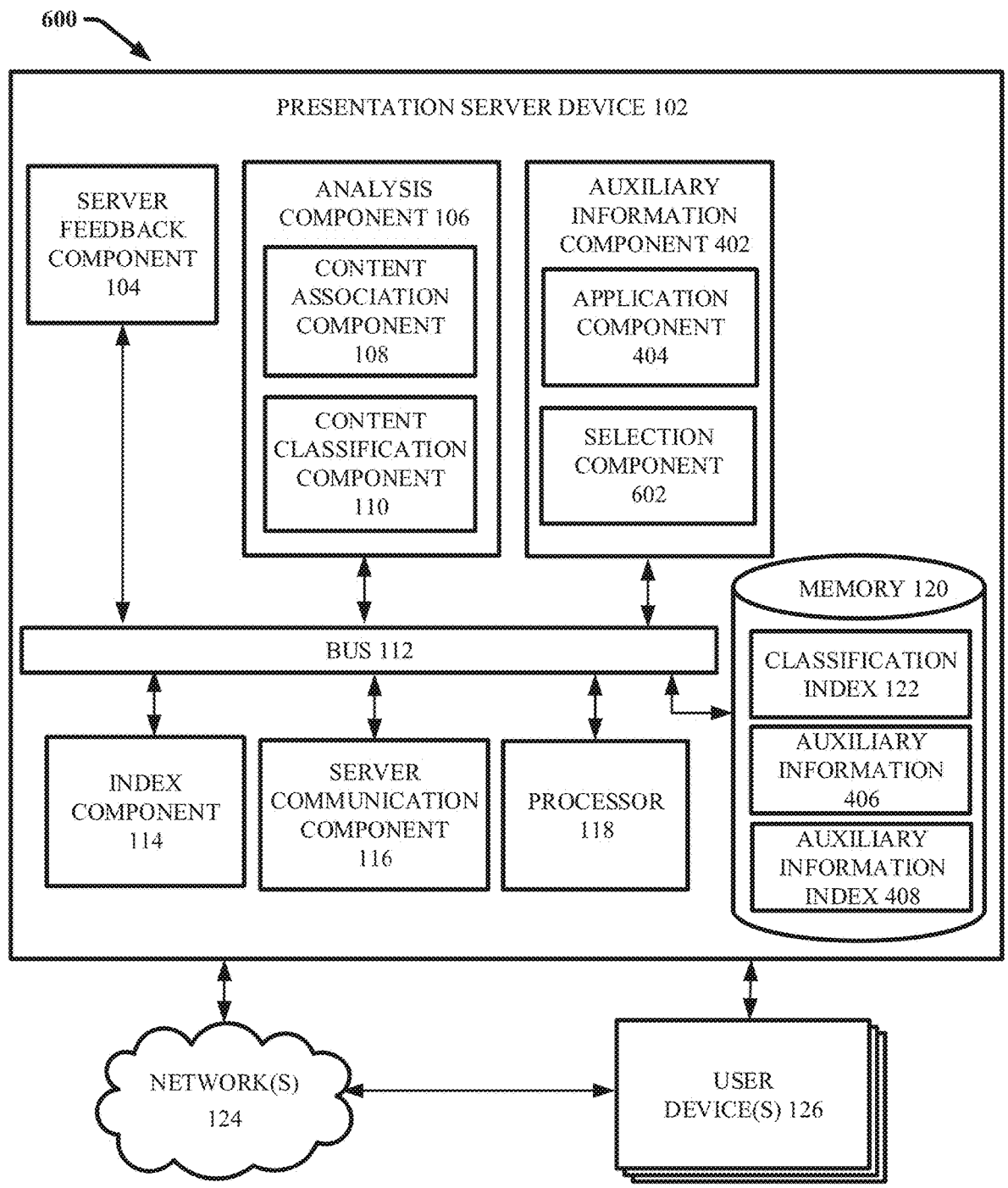
FIG. 6 illustrates a block diagram of another example, non-limiting system that facilitates generating auxiliary information for a media presentation and conditional provisioning of the auxiliary information in accordance with one or more embodiments described herein.

FIG. 6 illustrates a block diagram of another example, non-limiting system 600 that facilitates generating auxiliary information for a media presentation and conditional provisioning of the auxiliary information in accordance with one or more embodiments described herein. System 600 includes same or similar features as system 400 with the addition of selection component 602 to the auxiliary information component 402. Repetitive description of like elements employed in respective embodiment is omitted for sake of brevity. In various embodiments, after auxiliary information has been provided for a presentation and the index component 114 has generated an auxiliary information index 408 for the presentation, the selection component 602 can employ the auxiliary information index 408 to automatically select and provide auxiliary information to new users when the presentation is subsequently presented to the new users (e.g., either in a live context or during playback of a recording of the presentation). In particular, when the presentation is subsequently presented to a new user, the server feedback component 104 can receive new feedback regarding a mental state of the new user and/or an explicit desire for auxiliary information as the new user is viewing, listening to or otherwise experiencing the presentation. The type of feedback and the manner in which it is generated and received by the server feedback component 104 can include the same or similar type of feedback generated and received in a same or similar manner as that discussed with reference to FIG. 1. Based on reception of the new feedback, the content association component 108 can identify a part of the presentation associated with the new feedback (e.g., a defined topic, sub-topic, element, etc.) in a same or similar manner as that discussed with reference to FIG. 1 and system 100.

The selection component 602 can further select auxiliary information to provide to the new user at the user's user device based on the new feedback and the part of the presentation associated with the new feedback, as identified in the auxiliary information index 408 associated with the presentation. For example, based on information received and/or determined by the server feedback component 104 identifying a mental state of the new user or providing an explicit request for a type of auxiliary information, information determined by content association component 108 identifying a specific part of the presentation associated with a cause of the mental state of the user, and/or information regarding a known trait (e.g., intellectual level, learning type, etc.) and/or preference of the user, the selection component 602 can employ the auxiliary information index 408 to identify, determine or select the appropriate auxiliary information (e.g., included auxiliary information database 406) for providing to the new user. For example, based on reception of user feedback information indicating the user has a confused mental state in association with presentation of topic 2 of a presentation, the selection component 602 can access and employ the auxiliary information index 408 to determine whether clarifying auxiliary information has been provided for topic 2 in the auxiliary information database 406. In response to a determination that clarifying information has been provided for topic 2, the selection component 602 can retrieve the auxiliary information and the auxiliary information component 402 can provide (e.g., using server communication component 116) the auxiliary information to the user device of the new user (e.g., a user device of the one or more user devices 126 or another device) for rendering at the user device. Further, in an embodiment in which different versions of the auxiliary information associated with different user traits or preferences are provided, the selection component 602 can determine one or more traits and/or preferences of the user and select the version of the auxiliary information that is best suited for the user based on the user's traits and/or preferences. For example, if the user is a visual learner, the selection component 602 can select the version of the auxiliary information for topic 2 that is associated with visual learning.

In one or more embodiments, the auxiliary information component 402 can provide (e.g., using server communication component 116) selected auxiliary information associated with a part of a presentation to a user device (e.g., a user device of the one or more user devices 126 or another device) of a user in real-time or substantially real-time as the feedback is received for the user and the part of the presentation is being presented. The user device can further render the auxiliary information in association with presentation of the part of the presentation (e.g., as the part is discussed in a live context, as the part is presented in a live-context, as the part is presented or played in a slideshow or video in a live or non-live context, etc.). For example, if the auxiliary information is associated with a particular topic being presented, the user device can render the auxiliary information while the topic is being presented. In other embodiments, the auxiliary information can be rendered at a later time, such as during a break period after the topic is discussed or after the entire presentation is finished. With reference to FIGS. 3 and 6, the user device 300 can include rendering component 316 to render auxiliary information received from the presentation server device 102. For example, in an embodiment in which the auxiliary information includes audio, the rendering component 316 can cause the audio to be played at the user device 300 via a speaker of the user device (e.g., not shown). In another example, in an embodiment in which the auxiliary information includes visual data (e.g., text, images, video, hyperlinks, etc.) the rendering component 316 can generate a graphical user interface that can be displayed via the display 320 of the user device 300 and including received auxiliary information. The manner in which the auxiliary information is rendered at the user device can vary depending on the features and functionalities of the user device.

Figure 7:
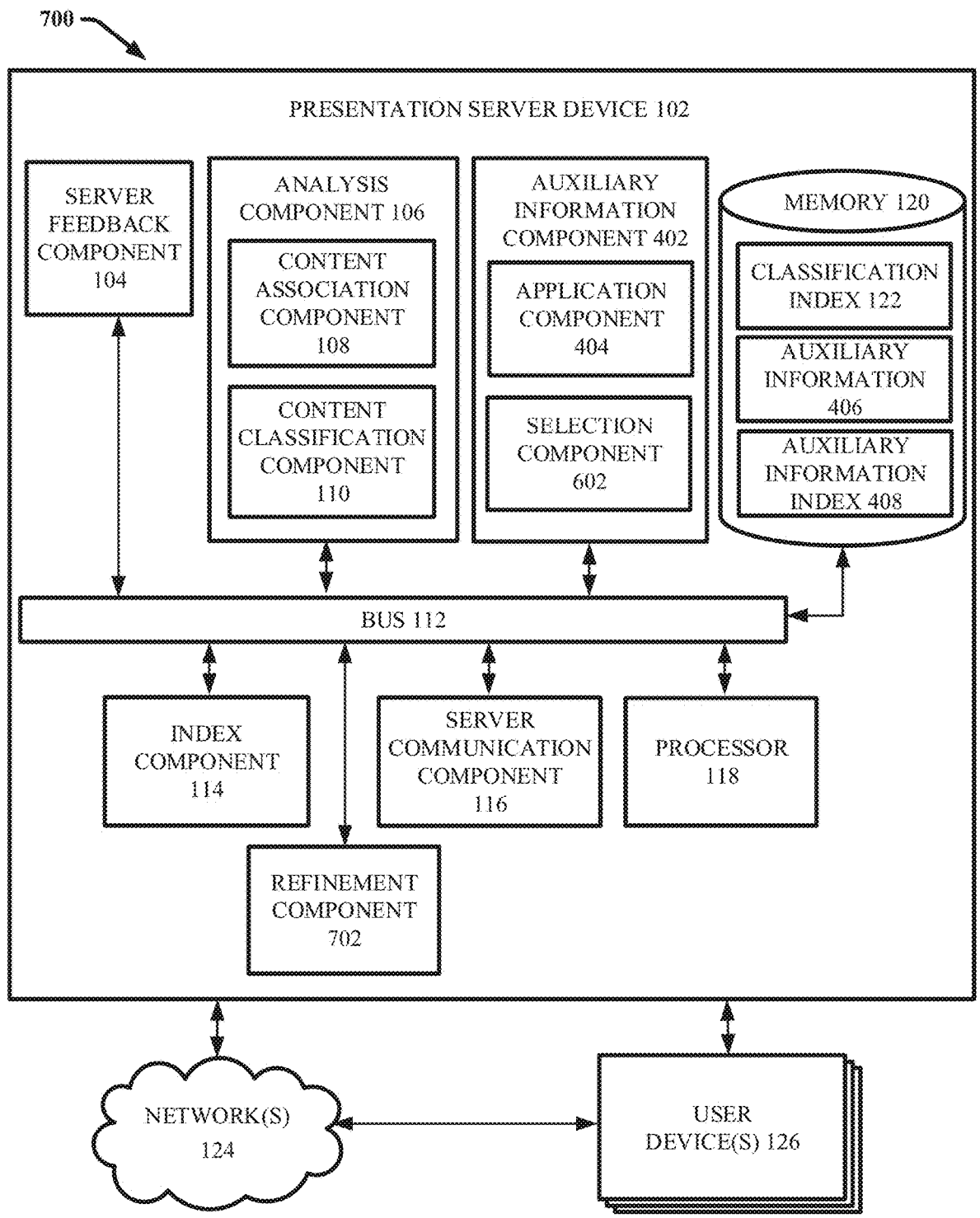
FIG. 7 illustrates a block diagram of an example, non-limiting system that facilitates refining auxiliary information generated for a media presentation in accordance with one or more embodiments described herein.

FIG. 7 illustrates a block diagram of an example, non-limiting system 700 that facilitates refining auxiliary information generated for a media presentation in accordance with one or more embodiments described herein. System 700 includes same or similar features as system 600 with the addition of refinement component 702. Repetitive description of like elements employed in respective embodiment is omitted for sake of brevity. In various scenarios, a presentation can be re-presented many times to new users and audiences. For example, after presenting a lecture to a first class of students, a teacher can present the same lecture to a second, third, fourth, etc., class of students. In another example, a presentation that includes an audio recording for a walking tour of a museum, historic building, city landmarks, etc., can be played back many times to new visitors. In another example, a presentation that includes a recorded video can be accessed and played back to new viewers on-demand any number of times. In view of these scenarios, the refinement component 702 can employ machine learning techniques to facilitate refining and improving classifications of respective parts of a presentation and/or auxiliary information associated with the respective parts of the presentation over time based on new user feedback received each time the presentation is re-presented to one or more new presentees.

For example, in some embodiments, when a presentation is re-presented to a new user and new feedback is received regarding respective mental states of the new user toward respective parts of the presentation, the analysis component 106 can determine and associate new information with the respective parts of the presentation regarding whether and to what degree the new user is confused, interested, bored, excited, amused, etc., with the respective parts of the presentation. As such new feedback is collected and received from more and more new users, the refinement component 702 can direct the classification component to re-classify the respective parts of the presentation based on a compilation of the initial feedback for which the initial classification was made and the new feedback. As classifications associated with respective parts of a presentation become more precise, the refinement component 702 can determine one or more parts of the presentation that may need new auxiliary information and/or modified auxiliary information based on a degree of change associated with the classification of the one or more parts.

The refinement component 702 can employ a similar mechanism to determine whether auxiliary information associated with a part of a presentation is helpful or otherwise well received by a user. For example, when a presentation is re-presented to a new user and auxiliary information for a part of the presentation is rendered to the new user, the server feedback component 104 can receive additional feedback from the new user regarding the new user's impression of the auxiliary information. For instance, the additional feedback can include information regarding a mental state of the user responsive to the auxiliary information as determined based on facial expression data, speech data, body movement data, biometric data, etc., received for the new user during presentation of the auxiliary information to the new user. The additional feedback can also include explicit feedback provided by the new user regarding the new user's impression of the auxiliary information. For example, in association with presentation of auxiliary information, a prompt can be presented to the new user asking the user to provide input selecting "yes" or "no" to indicate whether the user found the auxiliary information useful, interesting, amusing, etc. (e.g., or another intended impression for the particular auxiliary information). The refinement component 702 can therefore gather additional feedback information regarding the impressions the respective auxiliary information entries have on one or more new users. In some embodiments, the refinement component 702 can user this additional feedback information to identify auxiliary information entries that are well received (e.g., are associated with a favorable impression) and those that are not well received (e.g., are associated with an unfavorable impression). For example, in some embodiments, the refinement component 702 can score the respective auxiliary information entries based on a degree to which they are respectively associated with favorable and/or unfavorable feedback. The refinement component 702 can further identify outliers in the unfavorable direction. For example, the refinement component 702 can identify one or more auxiliary information entries associated with a score reflective of an unfavorable or highly unfavorable (e.g., with respect to a threshold score) user impression. The refinement component 702 can further generate and provide a recommendation (e.g., to the presenter or another entity responsible for revising auxiliary information for the presentation) identifying the one or more auxiliary information entries associated with the unfavorable score and suggesting modification or refinement of the one or more auxiliary information entries.

Figure 8:
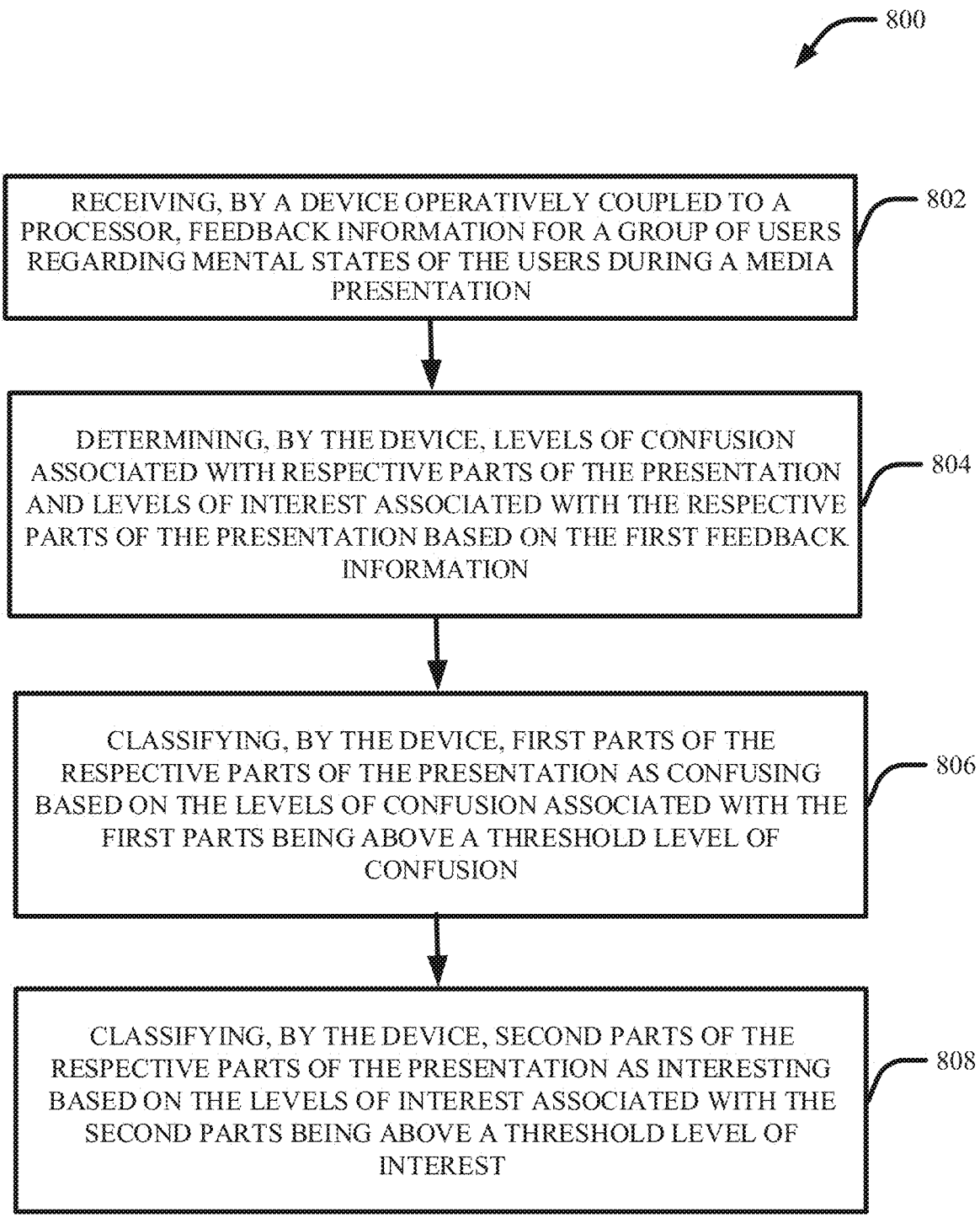
FIGS. 8 and 9 illustrate flow diagrams of an example, non-limiting computer-implemented method that facilitates classifying content of a media presentation in accordance with one or more embodiments described herein.

FIG. 8 illustrates a flow diagram of an example, non-limiting computer-implemented method 800 that facilitates classifying content of a media presentation in accordance with one or more embodiments described herein. Repetitive description of like embodiments employed in respective embodiments is omitted for sake of brevity. At 802, a device operatively coupled to a processor (e.g., presentation server device 102) receives feedback information for a group of users regarding mental states of the users during a media presentation (e.g., via server feedback component 104). At 804, the device determines levels of confusion associated with respective parts of the presentation and levels of interest associated with the respective parts of the presentation based on the first feedback information (e.g., via content association component 108). At 806, the device classifies first parts of the respective parts of the presentation as confusing based on the levels of confusion associated with the first parts being above a threshold level of confusion (e.g., via content classification component 110). At 808, the device classifies second parts of the respective parts of the presentation as interesting based on the levels of interest associated with the second parts being above a threshold level of interest (e.g., via content classification component 110).

Figure 9:
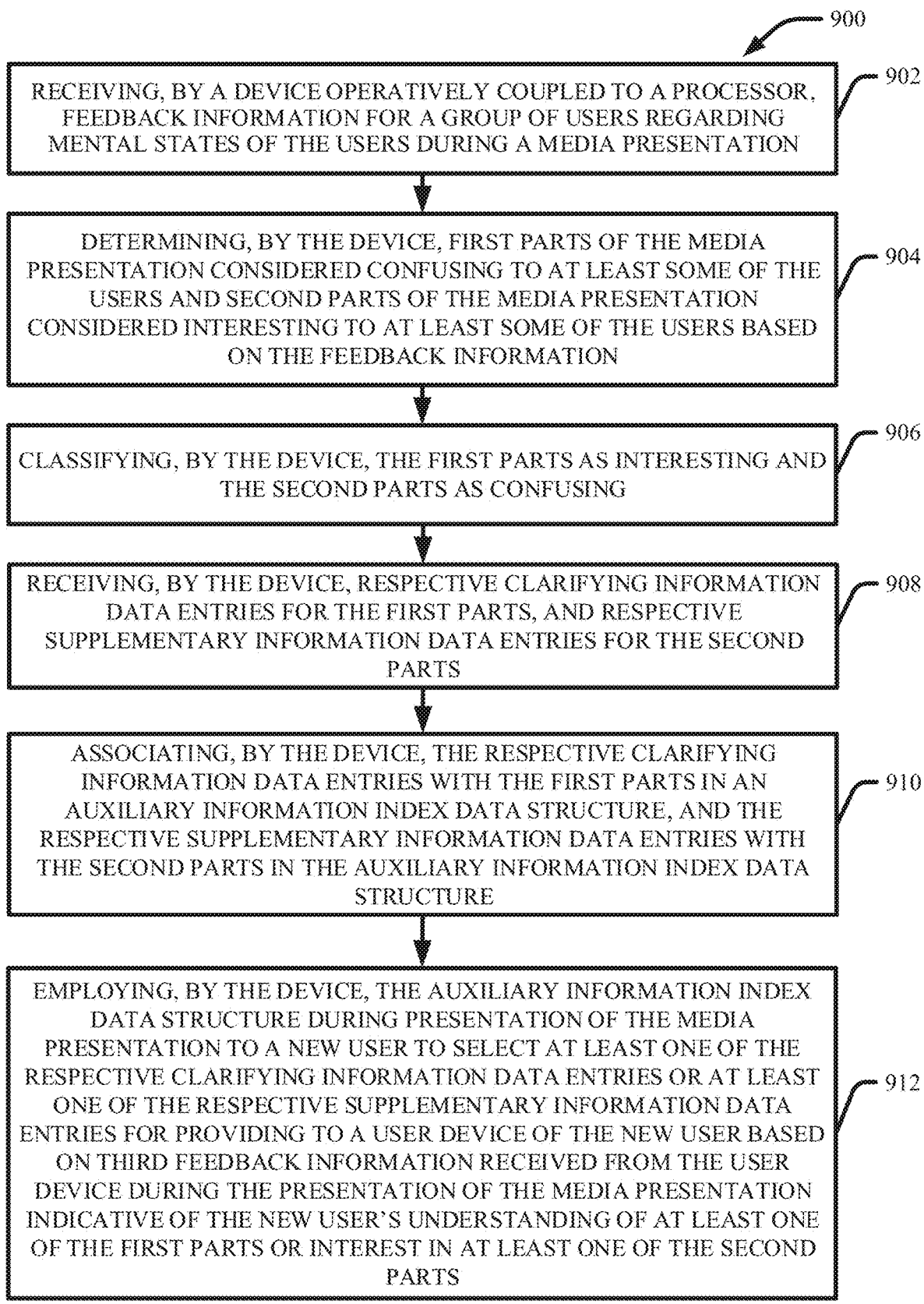

FIG. 9 illustrates a flow diagram of an example, non-limiting computer-implemented method 900 that facilitates classifying content of a media presentation in accordance with one or more embodiments described herein. Repetitive description of like embodiments employed in respective embodiments is omitted for sake of brevity. At 902, a device operatively coupled to a processor (e.g., presentation server device 102), receives feedback information for a group of users regarding mental states of the users during a media presentation (e.g., via server feedback component 104). At 904, the device determines first parts of the media presentation considered confusing to at least some of the users and second parts of the media presentation considered interesting to at least some of the users based on the feedback information (e.g., via content association component 108). At 906, the device classifies the first parts as interesting and the second parts as interesting (e.g., via content classification component 110). At 908, the device receives respective clarifying information data entries for the first parts, and respective supplementary information data entries for the second parts (e.g., via application component 404). At 910, the device associates the respective clarifying information data entries with the first parts in an auxiliary information index data structure, and the respective supplementary information data entries with the second parts in the auxiliary information index data structure (e.g., via index component 114). At 912, the device employs the auxiliary information index data structure during presentation of the media presentation to a new user to select at least one of the respective clarifying information data entries or at least one of the respective supplementary information data entries for providing to a user device of the new user based on third feedback information received from the user device during the presentation of the media presentation indicative of the new user's understanding of at least one of the first parts or interest in at least one of the second parts.

Figure 10:
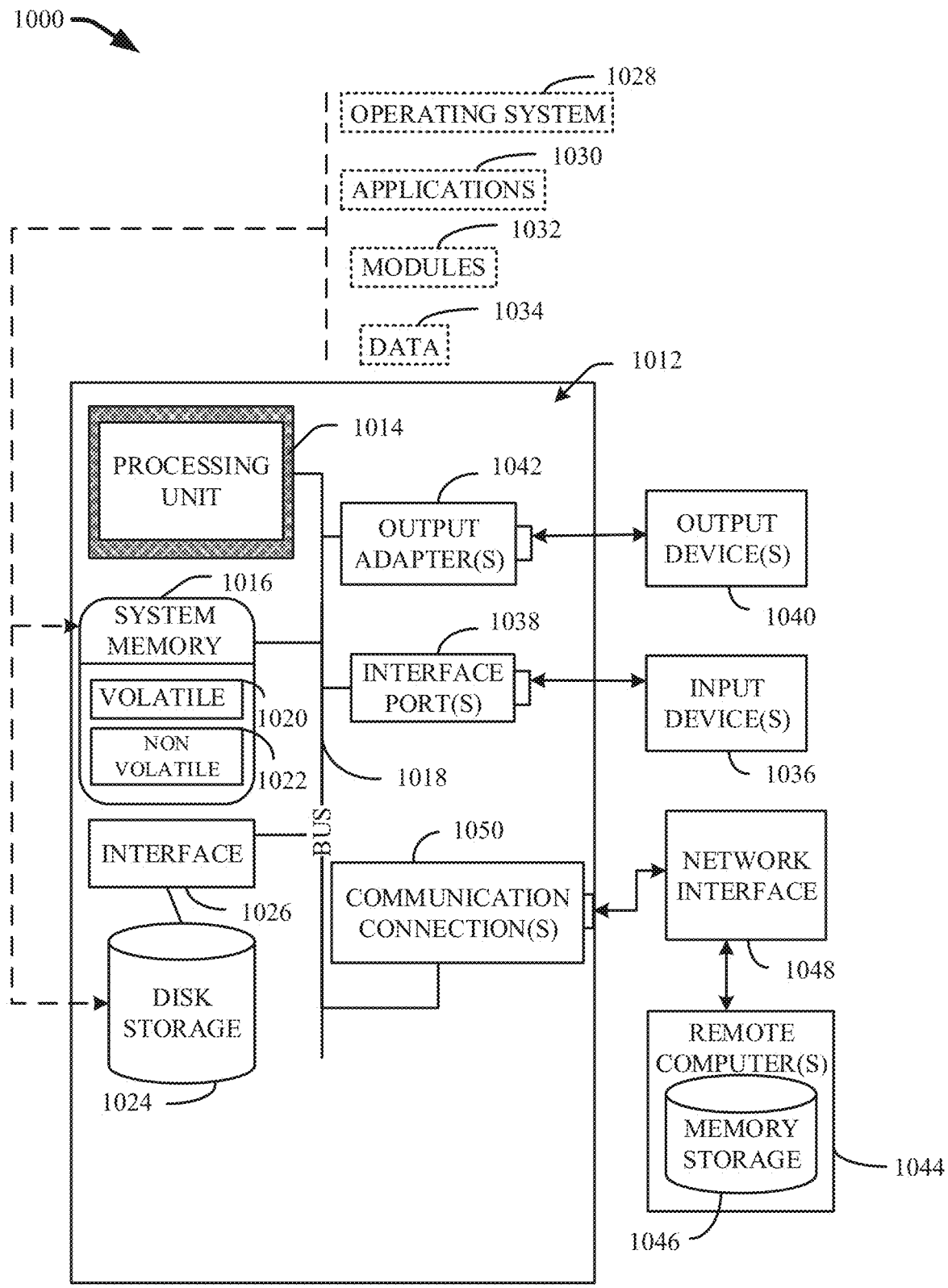
FIG. 10 illustrates a block diagram of an example non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1001 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1001. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "application," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory that stores computer executable components;
a processor that executes computer executable components stored in the memory, wherein the computer executable components comprise:
a feedback component that receives feedback information comprising dialogue recorded during a first presentation of a media presentation, wherein the dialogue is between a presenter of the media presentation and one or more users of the group of users;
an analysis component that:
determines first parts of the media presentation considered confusing to at least some of the users and second parts of the media presentation considered interesting to at least some of the users based on association of the first parts or the second parts with the recorded dialogue; and
determines the first parts or the second parts based on a number of questions asked during the recorded dialogue; and
an index component that generates an index data structure comprising first information identifying the first parts and classifying the first parts as confusing, and second information identifying the second parts and classifying the second parts as interesting.

2. The system of claim 1, wherein the analysis component further determines the first parts based on association of the first parts with a subset of facial expressions of the one or more users of the group.

3. The system of claim 2, wherein the subset of facial expressions is indicative of a mental state of confusion.

4. The system of claim 3, wherein the subset of facial expressions is indicative of a mental state of intrigue.

5. The system of claim 1, wherein the analysis component further determines the first parts or the second parts based on whether a first portion of the recorded dialogue associated with the first parts or a second portion of the recorded dialogue associated with the second parts is greater in duration.

6. The system of claim 1, wherein the computer executable components further comprise an auxiliary information component that receives respective clarifying information data entries for the first parts.

7. The system of claim 1, wherein the computer executable components further comprise an auxiliary information component that receives respective supplementary information data entries for the second parts.

8. The system of claim 7, wherein the index component further associates, in the index data structure, the respective clarifying information data entries with the first parts and the respective supplementary information data entries with the second parts.

9. The system of claim 8, wherein the computer executable components further comprise a selection component that employs the index data structure during a second presentation of the media presentation to select at least one of the respective clarifying information data entries or at least one of the respective supplementary information data entries to provide to a device based on second feedback information received from a user of the device during the second presentation of the media presentation.

10. The system of claim 9, wherein the second feedback information comprises information indicative of a level of understanding of the first parts by the user or a level of interest in the second parts by the user.

11. The system of claim 8, wherein the computer executable components further comprise:
a refinement component that scores the respective clarifying information data entries and the respective supplementary information data entries based on second feedback information, received for a group of new users during a second presentation of the media presentation to the group of new users, regarding respective reactions of the new users to the respective clarifying information data entries and the respective supplementary information data entries.

12. The system of claim 11, wherein the refinement component further selects one or more of the respective clarifying information data entries or the respective supplementary information data entries for modification based on association with a score indicative of an unfavorable user reaction.

13. A computer-implemented method, comprising:
receiving, by a device operatively coupled to a processor, feedback information comprising dialogue recorded during a first presentation of a media presentation, wherein the dialogue is between a presenter of the media presentation and one or more users of the group of users;
determining, by the device, levels of confusion associated with respective parts of the first presentation and levels of interest associated with the respective parts of the first presentation based on association of respective parts of the recorded dialogue with first parts or second parts; and
generating, by the device, an index data structure comprising:
first information identifying the first parts, classifying the first parts as confusing, and identifying the respective clarifying information data entries with the first parts; and
second information identifying the second parts, classifying the second parts as interesting, and identifying the respective supplementary information data entries with the second parts.

14. The computer-implemented method of claim 13, wherein the feedback information comprises information indicative of facial expressions of the users, the computer-implemented method further comprising:
determining, by the device, the first parts based on association of respective first subsets of the facial expressions indicative of a mental state of confusion with the first parts.

15. The computer-implemented method of claim 13, wherein the feedback information comprises information indicative of facial expressions of the users, the computer-implemented method further comprising:
determining, by the device the second parts based on association of respective subsets of the facial expressions indicative of a mental state of intrigue with the second parts.

16. The computer-implemented method of claim 13, further comprising:
receiving, by the device, respective clarifying information data entries for the first parts, and respective supplementary information data entries for the second parts.

17. The computer-implemented method of claim 16, further comprising:

employing, by the device, the index data structure during a second presentation of the media presentation to select at least one of the respective clarifying information data entries or at least one of the respective supplementary information data entries to provide to a device of a user based on third feedback information received from the user during the second presentation of the media presentation.

18. A computer program product for identifying respective parts of a media presentation considered confusing or interesting, the computer program product comprising a non-transitory computer readable storage medium having program instructions embodied therewith, the program instructions executable by a processing component to cause the processing component to:
receive feedback information comprising dialogue recorded during a presentation of media presentation, wherein the dialogue is between a presenter of the media presentation and one or more users;
identify, based on feedback information associated with a first presentation of the media presentation to users, first parts of the media presentation considered confusing to at least some of the users and second parts of the media presentation considered interesting to at least some of the users, wherein the feedback information comprises facial expression information regarding the dialogue recorded during the first presentation of the media presentation that is associated with the first parts or the second parts and information associated with questions asked during the dialogue; and
generate an index data structure comprising first information identifying the first parts and including clarifying information for the first parts, and second information identifying the second parts and including supplementary information for the second parts.

19. The computer program product of claim 18, wherein the program instructions executable by the processing component further cause the processing component to:
employ the index data structure during a second presentation of the media presentation to provide at least some of the clarifying information or at least some of the supplementary information to a device of a new user.

20. The computer program product of claim 19, wherein a providing the at least some of the clarifying information or the at least some of the supplementary information to the device of the new user is based on new feedback information received from the new user during the second presentation of the media presentation, thereby facilitating improved processing time for selection and provision of auxiliary information during the second presentation of the media presentation.

* * * * *